US007668692B2

(12) United States Patent
Tatom et al.

(10) Patent No.: US 7,668,692 B2
(45) Date of Patent: Feb. 23, 2010

(54) METHOD FOR WEIGHING VEHICLES CROSSING A BRIDGE

(76) Inventors: Frank B. Tatom, 715 Arcadia Cir., Huntsville, AL (US) 35801; George W. Herndon, 806 N. Dawson St., Thomasville, GA (US) 31792

( * ) Notice: Subject to any disclaimer, the term of this patent is extended or adjusted under 35 U.S.C. 154(b) by 271 days.

(21) Appl. No.: 11/975,819

(22) Filed: Oct. 22, 2007

(65) Prior Publication Data
US 2009/0024336 A1    Jan. 22, 2009

Related U.S. Application Data

(63) Continuation-in-part of application No. 11/545,905, filed on Oct. 11, 2006, now abandoned.

(60) Provisional application No. 60/725,592, filed on Oct. 11, 2005.

(51) Int. Cl.
*G06F 19/00* (2006.01)
(52) U.S. Cl. .................................................. 702/173
(58) Field of Classification Search .................. 702/173
See application file for complete search history.

(56) References Cited

U.S. PATENT DOCUMENTS 3,234,777 A * 2/1966 Joy .................................. 73/9

* cited by examiner

*Primary Examiner*—Tung S Lau
(74) *Attorney, Agent, or Firm*—Mark Clodfelter

(57) ABSTRACT

A method for weighing vehicles moving on a bridge deck pavement is provided. At least one vibration sensor is mounted on a lower side of the pavement to sense low frequency pavement vibrations generated by moving vehicle wheels and propagated in waves in the pavement. Vibration sensor output signals are provided to a computing device. Sensed vibration energy rate is computed and, with signals from vibration sensors mounted at two locations separated by a known longitudinal distance, vehicle speed is also computed. The weight of the vehicle is determined as the product of a calibration coefficient and the ratio of sensed vibration energy rate to velocity. Using vibration sensor signals indicative of wheel generated vibrations in the very near field and summing vibration energy rates computed from these signals during vehicle passage over the vibration sensors the weight of individual vehicles is computed when other moving vehicles are present.

20 Claims, 11 Drawing Sheets

TIME (SEC)
2 SECOND TIME PERIOD
TIME SERIES FOR VERT. COMP.

2 SECOND TIME PERIOD
VARIANCE FOR VERT. COMP

METHOD FOR WEIGHING VEHICLES CROSSING A BRIDGE

CROSS REFERENCE TO RELATED APPLICATIONS

This application is a continuation-in-part of U.S. utility application Ser. No. 11/545,905, filed Oct. 11, 2006, now abandoned which claims the benefit of provisional application No. 60/725,592, filed Oct. 11, 2005.

FIELD OF THE INVENTION

This invention relates generally to weigh-in-motion systems for measuring weight of moving vehicles, and particularly for measuring weight of vehicles as they cross bridges, overpasses or similar structures in order to monitor the vehicular loading of structures.

BACKGROUND AND RELATED ART

For purposes of this application, the term "bridge" as used herein refers to bridges that cross natural or manmade boundaries or obstacles, such as rivers and streams, ravines, canyons or the like, structures that cross underlying roads, railroads or any other structural contrivance having a free space thereunder and which conveniently connects two points for the purpose of facilitating movement of vehicular traffic. Furthermore, the bridge may have one or more spans, and a bridge deck that provides a surface on which vehicles move. The bridge deck typically comprises a pavement surface, which may be a more-or-less continuous slab of pavement material that is usually less than about a foot thick, and a bridge deck support structure that supports the pavement. Such support structure may be of a box-girder, beam-girder or other design. While Applicants' method is disclosed as being used in conjunction with a pavement bridge deck, the invention disclosed herein should be usable with all manner of bridge decking.

Monitoring weights of vehicles crossing a bridge is useful for a number of bridge management functions related to public safety, maintenance budgetary considerations and capital infrastructure projects. In this regard, the vehicles of primary importance are loaded trucks, and especially trucks that may be loaded above allowed limits with respect to bridge design load limits and known bridge structural deficiencies. Examples of bridge management functions are developing input data for advanced planning of bridge pavement and structural support enhancements and immediate alerting or logging incidents of overweight trucks for motivating urgent pavement and structural inspection and subsequent maintenance and/or repair. Bridge load monitoring is especially important considering the large number of aging and structurally-deficient bridges that are heavily used, this importance being particularly emphasized by well publicized catastrophic collapses of bridges with their attendant loss of life.

Conventional prior art systems for weighing vehicles crossing a bridge are usually in-pavement systems. These systems typically incorporate sensors that are installed in the pavement just below the pavement surface, and which utilize bending or flexure members similar to load cells. Usually these bending members are installed in the pavement of a bridge approach, and less frequently are installed in pavement of a bridge deck because of significant difficulties encountered by such an installation on bridge spans. These systems are also expensive in both equipment and installation costs. Further, these systems experience frequent failures, especially on more heavily used bridges, because of high cycle deflection and fatigue of sensing members, thereby requiring frequent maintenance. Because these sensors are installed in the bridge approach or bridge deck pavement, this maintenance requires disruption of traffic flow over what is typically a main traffic route, and these main routes usually have inconvenient detour routes available.

An off-road weigh-in-motion system for roadways has been disclosed in Applicants' previous patent (U.S. Pat. No. 6,692,567) which is incorporated in its entirety herein by reference. As disclosed, seismic signals, generated by vehicles traveling on a roadway, propagate through a distance of surface layer of earth adjacent the roadbed and are measured by a seismic sensor. The computed energy represented in the measured sensor output signal is indicative of vehicle weight. Such a system could be deployed alongside bridge approaches, but not on a bridge deck. Furthermore, bridge approaches often have a concentration of nearby access ramps and service roads thereby making practical application of this system for bridge vehicular loading difficult or impossible to implement because of interfering seismic signals from vehicles traveling on nearby roadway approaches. For this reason, Applicants' prior art only discloses a seismic system along a single roadway, and in some embodiments uses a rumble strip to generate a specific, identifiable seismic signal.

A distributed fiber optic detection system based on Sagnac and Michelson interferometers is proposed by Udd (U.S. Pat. No. 5,636,021) for simultaneously measuring location and amplitude of an acoustic disturbance on a bridge as well as simultaneously measuring slowly-changing local and regional longitudinal strains in bridge structure. Udd proposes a system wherein fiber optic sensor loops are installed within the bridge deck and encompass the entire bridge length.

The portion of the Udd system sensor having capability for simultaneously measuring location and amplitude of acoustic disturbance on a bridge is a continuously-distributed measurement sensor. Udd proposes to accomplish this by measuring two signals: a signal that is dependent on both disturbance magnitude and disturbance location in the loop (Sagnac interferometer component) and a signal that is dependent on disturbance amplitude but is independent of disturbance location (Michelson interferometer component). Significantly, Udd's system will be of little practical value for bridge applications because commonly there will be present more than one vehicle on a bridge; this is especially the case on bridges with longer spans and/or on moderately-to-heavily utilized bridges. In this common multiple vehicle situation, a determination of disturbance magnitude will be an indication of a sum of the weights of all vehicles present on a bridge span and a corresponding disturbance location will not represent an actual vehicle location.

The aspect of the Udd sensor system proposed for measuring local and regional longitudinal strain in a bridge structure is achieved by including local spectral reflective elements at points along an optical fiber cable in bridge pavement encompassing the entire length of a bridge. However, and as noted, this local strain information for a bridge cannot in general determine individual vehicle weight because local strain on a bridge is significantly influenced by weights and locations of all vehicles on the bridge span. Consequently, this system cannot measure weights of individual vehicles because local strain in a bridge span is sensitive to weights of all vehicles in all lanes of the bridge span. This fact may have motivated Udd's selection of locations for deploying local strain elements to be at or near span joint areas above vertical bridge supports. Local strains near the pavement surface at these particular between-span locations will be among the largest experienced throughout the bridge, and Udd appropriately notes that these strain elements are useful for indicating bridge health.

From the foregoing, the Udd system may provide useful information on the strains within bridge deck structure, but it is believed that this information, as disclosed, cannot be used for weigh-in-motion purposes to reliably measure weights of individual vehicles crossing a bridge.

Considering the deficiencies described in the aforementioned systems and methods, it is therefore an object of this invention to provide a reliable and satisfactorily accurate system for determination of weight of vehicles moving across bridges. It is a further object that such a weighing system has reasonable equipment cost and reasonable installation cost for existing bridges, as well as for new bridge constructions. It is yet another object that Applicants' measuring system is by nature robust relative to effects of traffic and inclement weather, with key components of the system located in relatively protected locations, i.e. under a bridge, so that maintenance is infrequent, but in the infrequent event that maintenance is required no disruption of traffic on a bridge is required to perform such maintenance. Other objects of the invention will become apparent upon a reading of the following appended specification.

SUMMARY OF THE INVENTION

The invention is a method for determining weight of a moving vehicle on a bridge. The method includes attaching sensors to the bridge, and includes mounting at least one discrete location vibration sensor to sense vibrations at a discrete location on the bridge, the sensor being responsive to low frequency vibrations. Such a sensor is mounted to a lower surface of the bridge pavement, the vibration sensor mounting being operative to mechanically couple wheel-generated low frequency pavement vibrations propagating through the pavement directly into the vibration sensor. The method further includes sensing low frequency pavement vibrations produced by a moving vehicle using at least one vibration sensor and providing sensor electrical output signals including those proportional to the low frequency pavement vibrations to a computing device. Using the computing device, the weight of the moving vehicle is determined using sensor output signals.

DETAILED DESCRIPTION OF THE INVENTION

Vehicle Generated Vibration in Bridge Pavement

Figure 1A:
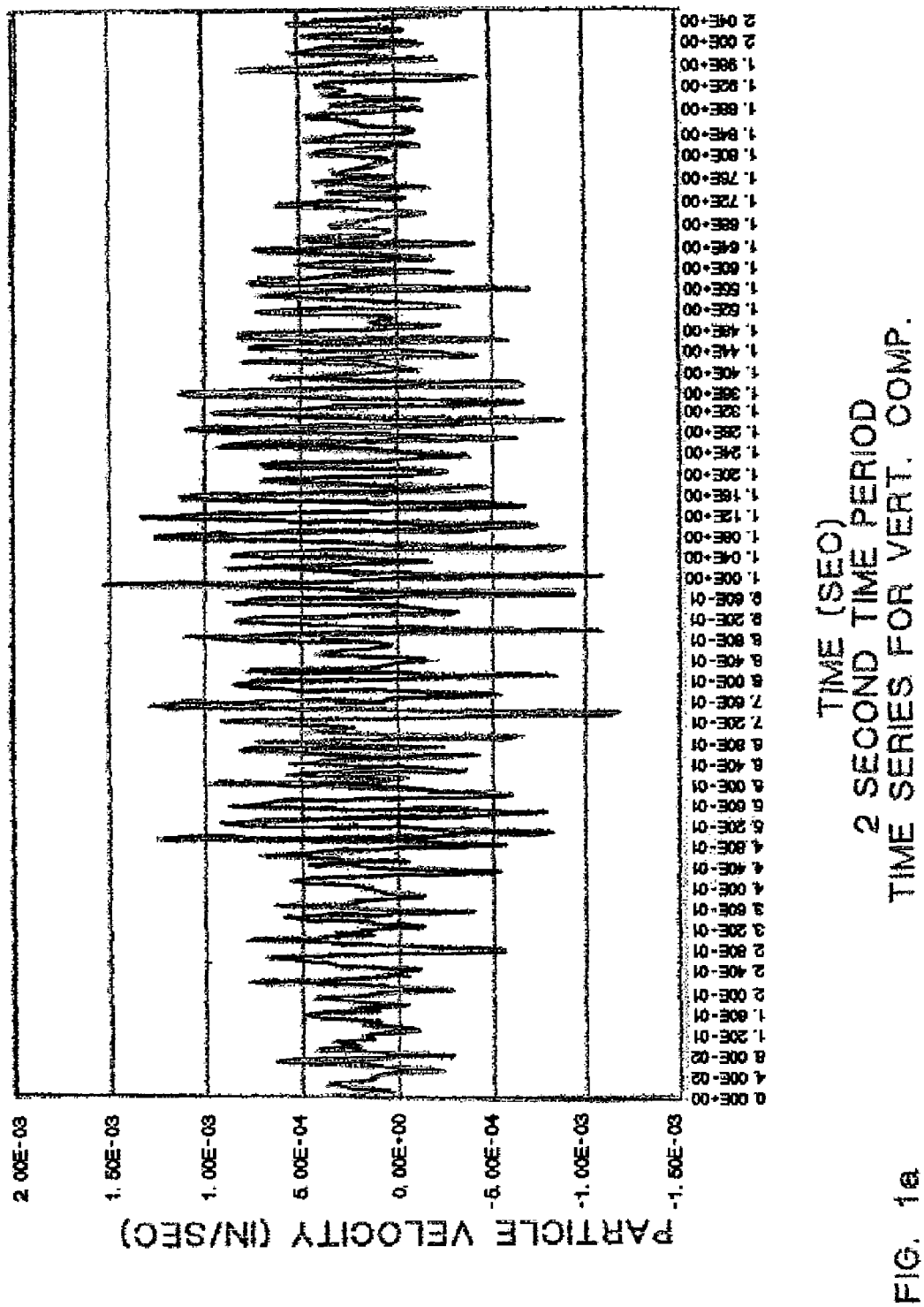
FIG. 1a is a time series graph over about 2 seconds of wheel generated pavement vibrations measured by a vibration sensor optimized to detect vertical vibrations.

Whenever in motion, a vehicle encounters rolling resistance on a roadway or on a bridge. The rolling resistance includes the vehicle interaction with the bridge deck pavements. In order to continue its motion, the vehicle must supply energy at a rate sufficient to overcome this rolling resistance. Based on automotive engineering studies, the rolling resistance, $R_r$, of a vehicle wheel is related to the vehicle weight, W, and the rolling resistance coefficient, K, according to the relation, $$R_r = KW$$

The rolling resistance coefficient, K, is weakly dependent on pavement temperature and moisture content, but is approximately equal to 0.012 under normal driving conditions. If the vehicle moves with speed, V, the energy rate to overcome the resistance is $$E_R = R_r V$$

The energy rate, $E_R$, is defined as $$E_R = C_i \sum_{n=1}^{N} \sigma_i^2, n$$

where $C_i$ = correlation coefficient for $i^{th}$ component of particle velocity N = total number of samples in sample interval n = sample number index i = component number (=1, 2, 3) of particle velocity $\sigma_{i,n}^2$ = variance of the $i^{th}$ component of particle velocity for the $n^{th}$ sample with a specific block size.

Therefore, $$W = E_R/(KV),$$

that is, weight of a moving vehicle is proportional to a ratio of energy rate being expended to overcome rolling resistance, and a vehicle's speed. Some of this expended energy is reflected into the atmosphere, while a sizeable fraction takes the form of vibrations generated in the pavement by vehicle wheel rolling contact with the pavement. The so generated and propagated solid-material mechanical vibration will herein be referred to as pavement vibration. This pavement vibration propagates in the pavement as vibration waves, and is eventually dissipated in the pavement and in the supporting bridge structure. As will be described, a measure of the energy propagating as pavement vibration per unit time is therefore indicative of an energy rate required to overcome rolling resistance.

The interaction of a moving vehicle with the pavement includes a moving spot compression followed by a release of the pavement surface for each wheel of the moving vehicle. This moving compression-release spot is a moving source of solid-material mechanical vibrations in the pavement surface along the track of a vehicle wheel, and this vibration propagates in the pavement away from the moving source. The pavement vibrations propagating in the pavement have the bulk of their energy transported in low frequency pavement vibrations with frequencies between approximately 0.5 Hz and 100 Hz. With pavement materials used in bridge decks, such as concrete and asphalt, the wavelength of this low frequency pavement vibration correspondingly ranges from hundreds to tens of thousands of feet in length.

The dynamical form of propagation of low frequency pavement vibrations can be resolved into both longitudinal and transverse body waves; and also surface waves. A longitudinal wave transports pavement vibrations having material motion in the direction of propagation. A transverse wave transports pavement vibrations having material motion in a direction transverse to that of wave propagation. In the roadway case of Applicants' prior patent, longitudinal waves further propagate outward into the surrounding earth as seismic waves. In the bridge case, however, transverse low frequency pavement vibration waves tend to be confined within the pavement as they reflect from lower and upper pavement surfaces. Consequently, at a particular sensing location on the lower surface of the pavement generally underneath the vehicle track, low frequency pavement vibrations sensed will primarily be downwardly directed transverse waves, with a small proportion of longitudinal waves developed as a vehicle nears a sensor location. As the transverse waves are directional, i.e. propagating downward, they may be reliably sensed in a small area around a moving footprint of a moving wheel.

Measuring Weight of a Moving Vehicle on a Bridge

The invention is a method for measuring the weight of a moving vehicle on a bridge. Much of the disclosure herein describes the invention as it applies to a single lane; however extension to multiple lanes is also within the scope of the invention. The invention includes measuring low frequency pavement vibration, which as noted above, is defined as pavement vibrations between about 0.5 Hz to about 100 Hz generated by vehicles moving over pavement of a bridge deck. Sampling of these vibrations to is accomplished using vibration sensors mounted to a lower surface of the pavement generally underneath a track of a moving vehicle. For purposes of this application, sensors may be mounted to a pavement lower surface as by bonding, attaching with mechanical fasteners, or a combination of bonding and fastening. In other embodiments, sensors may be inserted and secured in a surface cavity of the pavement lower surface. In any case, mounting of a sensor is of a nature so as to achieve a secure and rigid mechanical coupling of the sensor to the lower surface of the pavement underneath lanes where vehicles travel. Speed of a moving vehicle, which directly influences vibration energy rate imparted to the pavement, may be determined either by a direct sensor measurement of vehicle speed or may be determined indirectly. Such indirect determination of vehicle speed may be obtained from a difference of detection times of low frequency pavement vibrations by sensors mounted at two locations along a vehicle track, as will be described below. Vehicle weight may then be determined by multiplying a ratio of computed energy rate of low frequency pavement vibration measurement signal to vehicle speed by a coefficient of proportionality determined through calibration.

In some embodiments, measuring low frequency pavement vibration may be accomplished by sensing pavement vibrations in a wider range of frequencies band desirable for computation of vehicle weight, and then filtering sensor output signals to isolate, measure and use a low frequency component, or via use of sensors that are responsive only to a low frequency component of downwardly propagating pavement vibrations. The measuring of pavement vibration is accomplished using one or more discrete location vibration sensors. As used herein, a discrete location vibration sensor is a sensor that senses, for the most part, downwardly propagating pavement vibration over and resolved to a discrete measuring area that is small relative to a typical bridge pavement surface area. For practical purposes of the invention, measurements of pavement vibration are taken from specific, discrete locations on the bridge. This discrete measurement area may be quite small, for instance an area associated with a mounting area of a small, commercially available accelerometer.

As noted above, an accelerometer is such a discrete location vibration sensor for sensing vibration in the range of 0.5-100 Hz. Examples of other types of sensors that may be used to detect downwardly propagating low frequency pavement vibrations at a discrete location of the lower surface of the pavement are certain types of geophones, seismometers, optical vibration sensors, LVDT (Linear Variable Differential Transformer) displacement transducers, and eddy current probes (for reinforced concrete pavement).

Another aspect in measurement of low frequency pavement vibrations for determining moving vehicle weight is the benefit in using multiple vibration sensors measuring at a same or close location, but that are disposed differently. A convenient example of such a set of differently-disposed sensors is a 3-axis set of accelerometers in which axes are mutually orthogonal. Mounting such a 3-axis set of accelerometers on the lower surface of a bridge deck pavement may result in measurements of low frequency pavement vibrations that are resolved to horizontal/North-South, horizontal/East-West, and vertical. Availability of the three low frequency vibration measurement directional components allows flexibility in choosing signals either individually or in combinations for processing that in certain bridge applications may result in improved signal-to-noise measurement of low frequency pavement vibration energy rate, and possibly achieving more accurate timing for determining vehicle speed. The result may be a more accurate determination of vehicle weight.

For a vibration sensor such as an accelerometer in which material motion of a discrete measuring area is directly sensed, an output signal of a sensor mounted at a particular sensing location on a lower surface of pavement will oscillate in time with an amplitude that varies according to a distance separating a moving vehicle source and a sensor. Pavement vibration energy rate represented in the sensor output signal that is representative of a time t may be approximated by computing an average signal energy over a predetermined short time increment spanning time t. This approximation may be accomplished by sampling a sensor output signal (sampling the signal is defined as measuring signal value at a time instant) at a preselected sampling rate and saving the set of sample measurements over the time increment. The set of saved signal sample measurements from designated time increment representative of time t is herein defined to be the sample block for time t. Signal energy rate representative of time t is then determined by computing variance of sample measurements in the sample block. This signal energy rate representative of time t is herein defined as block variance for time t.

The next time t corresponds with a next measurement sampling time, and a new block variance computation starts with inputting the new measurement sample into the sample block and purging the oldest measurement from sample block. This mathematical technique utilizing a step progression of computing block variances over sequential but overlapping sets of sample blocks is well known as a moving variance technique (also known as a sliding variance technique). As utilized herein for determining a time step progression of block variances representative of time progression of a signal energy rate, this and similar techniques are herein defined to be a time step moving variance technique.

Figure 1B:
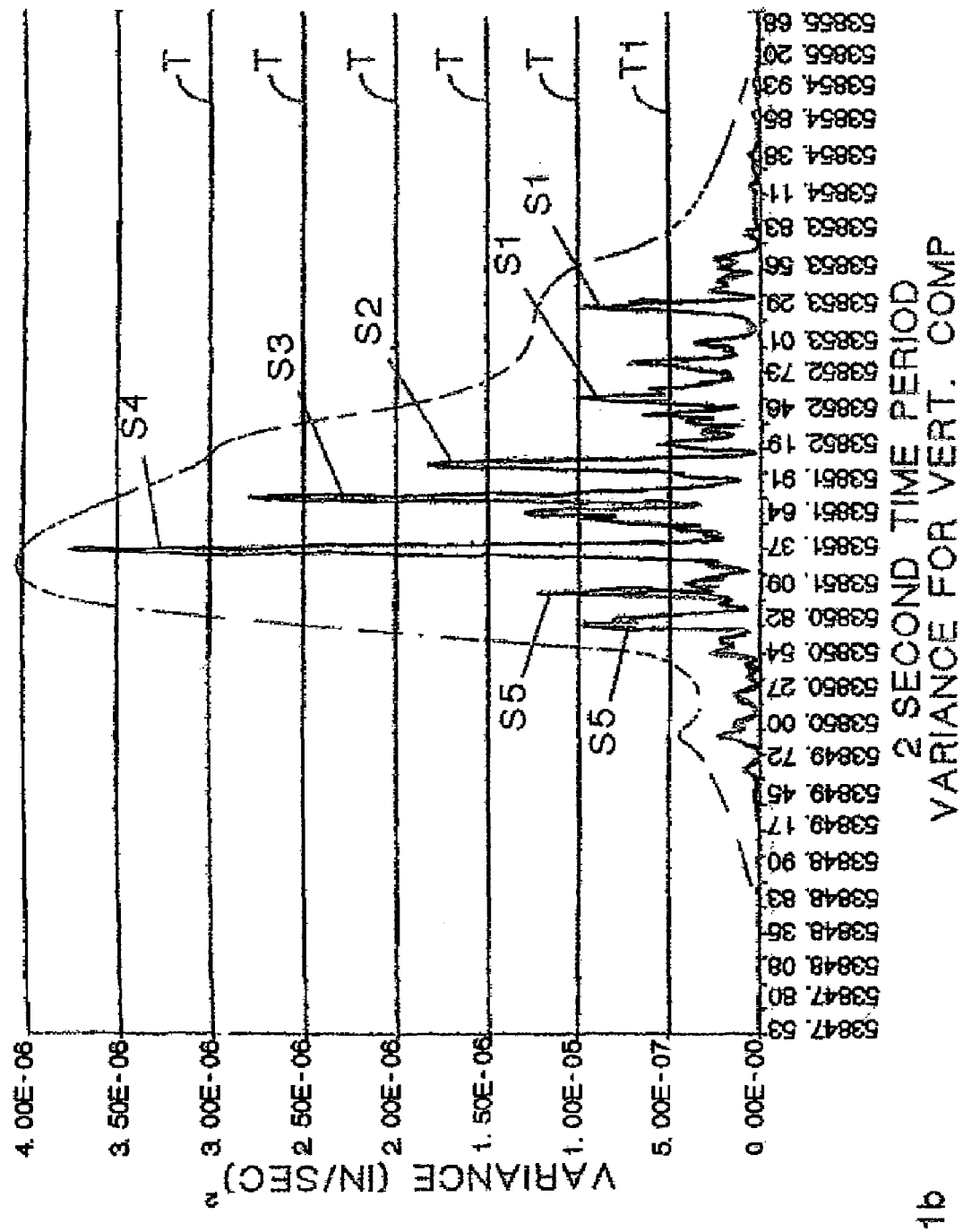
FIG. 1b is a graph showing block variance calculated over about a 2 second period as wheels of the truck pass adjacent or over a vibration sensor optimized to detect vertical vibrations.

Applicants' have found that a sampling rate of 500 Hz (time steps of 2 milliseconds) and a block variance computation time increment of 50 milliseconds (giving a sample block size of 25 samples) are particularly useful for characterizing low frequency pavement vibration generated by vehicles moving at typical highway speeds. By way of example only, a measured low frequency pavement vibration over a period of about two seconds using a sampling rate of 500 Hz is displayed in FIG. 1a for the passing of a single truck. Again by way of example only, a sequence of block variances of measured truck vibration with a sample block size of 25 is displayed in FIG. 1b with the same sampling period of about two seconds. The truck used for these sample vibration measurements was a loaded "18 wheeler" moving at about 60 MPH. Here, as shown in FIG. 1b, it is believed one or both spikes S1 may be representative of a front axle of a tractor portion of the truck, one or both of spikes S2 and S3 may be representative of the two rear axles of the tractor where a front portion of a trailer bears, and spikes S4 and S5 may be representative of rear axles of the trailer. While a distance between these spikes may not accurately reflect intra-axle spacing, it is anticipated that with careful placement of vibration sensors in conjunction with establishing threshold levels of vibration measurement during processing, individual wheels or clustered sets of wheels will be discriminated.

Other sampling rates and variance computation time increments may also be useful, and their use is within the scope of the invention. One example of using different sampling rates and block sizes relates to developing an "envelope" of vibrations related to passage of a single truck in order to discriminate between two closely spaced trucks moving at highway speeds.

Vehicle speed, V, required for determining vehicle weight, may be directly sensed and measured, for example by a radar gun or some other direct speed sensing sensor. Vehicle speed may also be determined indirectly, for example by computing vehicle speed inferred by a rise rate and/or fall rate of signal amplitude or of sensor block variance relative to their maximum values corresponding to over passing of a vehicle to be weighed. Because rise and fall rates of signal amplitude and sensor block variance are not simple functions of vehicle-to-sensor separation distance and because these rise and fall rates also depend on the various characteristics of a bridge application, such as pavement material and thickness, among other things, use of this indirect method requires empirical predetermination of vehicle speed vs measured rise rate (and/or fall rate). One embodiment that utilizes this indirect speed determining method employs a single vibration sensor for determining both energy rate of low frequency pavement vibration generated by a moving vehicle and vehicle speed. Therefore, vehicle weight may be determined in this embodiment via a single vibration sensor. In some instances, this sensor, and embodiments using two spaced-apart sensors, has/have an axis oriented vertically so as to be most sensitive to low frequency vibrations propagating downward through the pavement. Use of such sensors may serve to localize a measurement range of the sensors to a radius of about 10-12 feet or smaller.

Average vehicle speed may also be indirectly determined by sensing low frequency pavement vibration at a second location on the lower surface of pavement using a second vibration sensor, this second sensor being positioned a known distance along the direction of vehicle travel from the first sensor. Vehicle speed is then computed by dividing the known sensor separation distance by elapsed time between achieving the same recognizable attribute in the measured vibration sensor output signals taken from the separated sensors. This recognizable attribute may be amplitude of the signal or the signal's block variance reaching a preselected threshold value. Other possible recognizable signal attributes may be a maximum in signal amplitude or a maximum in signal block variance, such as spike S4 in FIG. 1b. One skilled in the art may construct similar and equivalent methods for indirectly computing vehicle speed based on the vibration sensor outputs in which sensors are located at two different locations along a direction of vehicle travel. Although embodiments that utilize this method of average vehicle speed determination require vibration sensors at two or more locations, vehicle speed so determined may be more accurate and more simply and directly determined than with embodiments utilizing a rise/fall rate method. On the other hand, an embodiment for a portable and/or a temporary application may instead conveniently employ a separate vehicle speed sensor and a single vibration sensor mounted underneath a lane over which vehicles travel.

Vibration energy rate used in vehicle weight computation is the sum of successive block variances in a time period corresponding with a vehicle's wheels passing over the vibration sensors, a block variance sum for each wheel or wheel cluster contributing to a total block variance used in vehicle weight computation. Summing time period is herein referred to as a summation period. A practical upper limit for a summation period may correspond with vehicle transit time over the entire bridge span. This maximum practical summation period could be several seconds or more in duration if a bridge is long and a vehicle is moving slowly. However, shorter summation periods are usually more useful because of frequent simultaneous presence of other vehicles moving on the same bridge span as discussed below. Vibration energy rate used in vehicle weight computation may be from summing a plurality of sequences of block variances from a single sensor, or from summing sequences of block variances from multiple sensors at a single location, or from sensors at two or more locations that are also used for determining vehicle speed.

Very Near Field Low Frequency Pavement Vibrations

As noted above, a complication in weighing a particular vehicle arises when other vehicles are simultaneously moving on the same bridge span. This complication arises because low frequency pavement vibrations are generated at all vehicle wheel-pavement interactions on the bridge span. Consequently, it is a composite of all low frequency pavement vibrations propagated in waves throughout the pavement and impinging on a discrete measurement area that are sensed by a vibration sensor. The inventive concept includes embodiments that resolve this complication as described below.

The short period of time while a moving vehicle is generally over a location of a vibration sensor is herein defined as closest transit. During closest transit, a sensed low frequency pavement vibration is a composite of waves propagating from a vehicle's wheels. It should be recalled during reading Applicants' specification that low frequency vibrations from truck wheels generate a moving field of vibrations, these vibrations being strongest directly beneath a wheel of a truck. Within this field, the composite of waves includes large body wave components that are directly propagated generally downward where they are detected by a sensor, as well as other waves that are arriving at the sensor after only a few reflections between pavement surfaces. In one embodiment, a vibration sensor may be mounted on a pavement lower surface underneath approximately a transverse mid-lane of a traffic lane, and thus is underneath approximately mid-axle of a vehicle in most cases. For this embodiment during closest transit, sensed low frequency pavement vibrations having a largest amplitude will arrive at a sensor from all wheels within an established measurement zone of a sensor, and typically will include wheels associated with an axle passing overhead or wheels on clustered axles. In another embodiment, a vibration sensor may be mounted directly underneath a wheel pavement track over which wheels of vehicles pass. In this embodiment, during a vehicle's closest transit, sensed low frequency pavement vibrations include pavement vibrations propagating within a radius of a sensor location; however, when one or more vehicle wheels are directly above a sensor, sensed pavement vibration is dominated by vibration propagating directly downward from the wheels.

When moving vehicles are at instantaneous locations more distant on a bridge span from a vibration sensor, low frequency pavement vibration is a composite of vibrations that have sustained significant dispersion and attenuation during propagation to a sensor location. Consequently, sensed low frequency pavement vibrations generated at a distance are of significantly lower amplitude (and block variance) compared with low frequency vibrations sensed during closest transit. Therefore, when a vehicle to be weighed is approaching the vibration sensors, sensed low frequency pavement vibrations will be of low amplitude at a distance from the sensor, and sensor output signal amplitude will increase rapidly as the vehicle nears the sensor. As the truck passes over the sensor, the signal peaks during closet transit, and then decreases rapidly as the vehicle travels away from the sensor. For a mid-lane embodiment, sensor output signal amplitude has a noticeable, distinctive peak as each vehicle axle passes over the sensor. Consequently, by only utilizing sensor output signals with amplitude or block variance above a threshold set just below a peak signal strength, a mid-lane embodiment can discriminate vibrations to wheels that within about 10-12 feet of a vibration sensor. For a directly-below-the-wheel-track embodiment, sensor signal amplitude (and block variance) similarly rises when wheels are over the sensor, but signal amplitude (and block variance) has an even higher and sharper peak as a wheel or twinned wheels pass directly over a sensor. For a directly-below-the-wheel-track embodiment, by suitably setting a threshold value, this embodiment can discriminate vibrations that are from wheels within about 4-8 feet of the sensor. Because low frequency pavement vibrations used to discriminate wheels or axles are most intense within about twelve feet of a vibration sensor, whereas a wavelength of low frequency pavement vibration ranges between hundreds to tens of thousands of feet, these locally discriminated low frequency pavement vibrations are herein referred to as very near field low frequency pavement vibrations, and embodiments of the invention that utilize measurement of these particular vibrations are deemed very near field embodiments.

The invention includes very near field embodiments such as a mid-lane embodiments and directly-underneath-the-wheel-track embodiments that employ appropriately-set discrimination thresholds either for sensor output signal amplitude or for block variance computation. Because sensor output signal strength varies with vehicle speed, the discrimination threshold may also adjusted for vehicle speed. A discrimination threshold in a particular embodiment may be determined by first establishing a reference threshold level based on a vehicle of known weight moving over a sensor at a reference speed during calibration of the system. By way of example only, any of lines T in FIG. 1b may be a threshold setting, depending on a minimum weight of a vehicle to be weighed and speed of the vehicle. A threshold level utilized in discriminating very near field sensor signals for input into sample blocks for variance calculation is then a reference threshold level multiplied by a ratio of actual measured vehicle speed to a reference vehicle speed.

Figure 3:
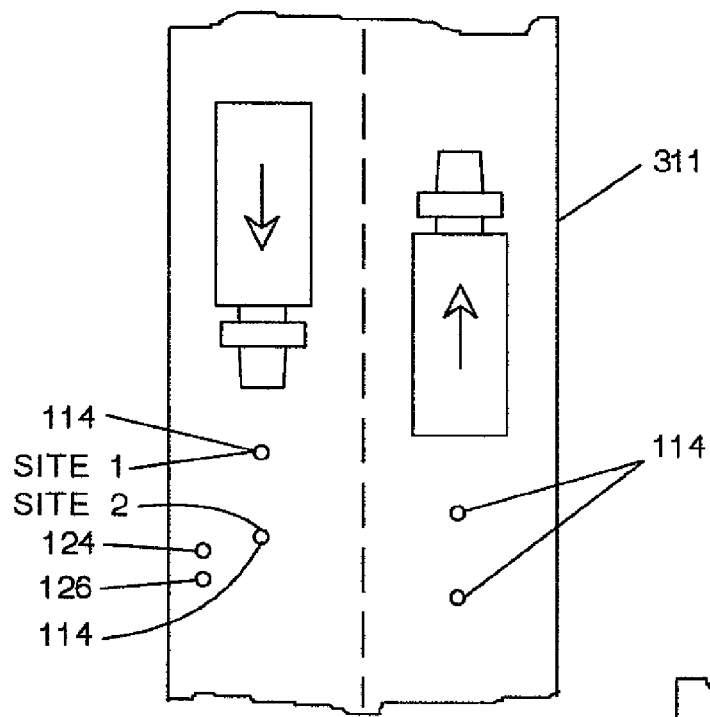
FIG. 3 illustrates an embodiment wherein a pair of sensors is mounted underneath a transverse middle of each lane of traffic.

With a discrimination distance or radius of about 12 feet or less, or width of a traffic lane, a mid-lane very near field embodiment is particularly useful for applications in which there is at most infrequent presence of a heavy vehicle in an adjacent lane. Applications of this nature include single-lane bridges and bridges that are infrequently used by trucks, and especially those bridges that have only two lanes with one lane for travel in each direction. This latter application is depicted in FIG. 3 in which sensors are placed mid-lane for each lane. With more frequently used bridges, and especially with higher capacity bridges including those which have multiple same-direction adjacent lanes, there is a higher probability that vehicle weights determined using the mid-lane very near field embodiment will be compromised by including low frequency pavement vibrations emanating from vehicles moving in a neighboring lane.

Figure 4:
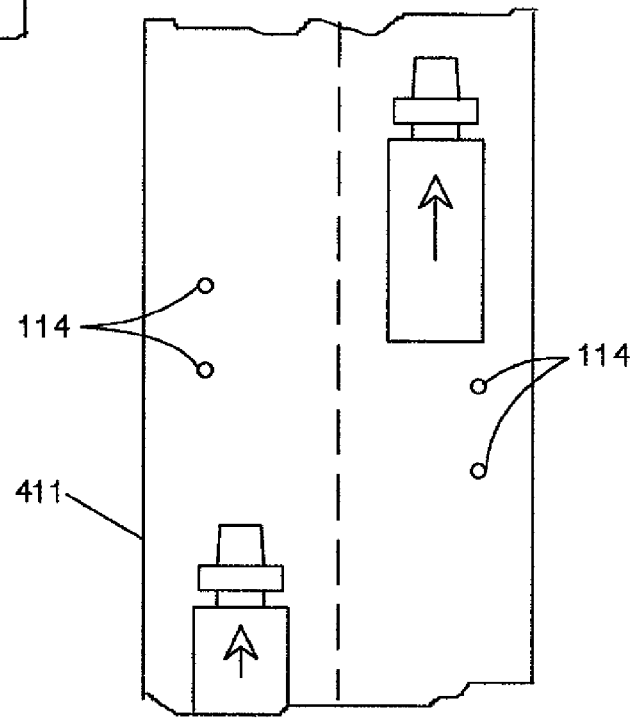
FIG. 4 illustrates an embodiment wherein a pair of sensors is mounted directly underneath a portion of bridge deck over which wheels of vehicles pass.

With these frequently used bridges including multilane same direction bridge applications, a directly-underneath-the-wheel-track very near field embodiment may be more reliable than a mid-lane embodiment. As depicted in FIG. 4, a section of bridge having two same-direction lanes is illustrated in which a directly-underneath-the-wheel-track very near field embodiment utilizes a set of vibration sensors located in an in-line pattern underneath and disposed transversely to outside wheel tracks of each lane. This very near field embodiment achieves a high degree of vehicle vibration source discrimination because a very near field low frequency pavement vibration measuring distance is less than about 4 feet, as determined by a threshold setting, and a nearest vehicle wheel track in a neighboring lane will be about a width of a lane (e.g., at least 12 feet) from sensor locations.

To determine weight of a vehicle using a very near field embodiment, a succession of block variances over a summation period precisely coinciding with closest transit of an entire vehicle is used. However, vehicles of primary interest, i.e., trucks, can significantly vary in configuration and length from a simple truck having 2 or 3 axles up to a tractor-trailer with 5 or more axles with dual wheels on all axles except a front axle, and with these axles distributed over a truck length that is nearly three times length of a short, simple truck. Difficulty in distinguishing individual trucks for weighing most frequently occurs when a short truck is closely followed by another truck.

In one embodiment, the task of distinguishing individual trucks for very near field block variance summing uses an indirect method that is based on the observation that in a majority of instances at normal bridge traffic speeds, a distance between a leading truck's rear-most axle and a trailing truck's front-most axle will be longer than a longest distance during which vibrations from a sensor will be below an established threshold. Here, with a software threshold associated with a sensor set so a very near field of vibrations is measured at a radius of about 12 feet, as the rear axle of a tractor passes over a sensor, the axle will be sensed as it moves away for a distance of about 12 feet. Likewise, as a leading rear axle of the trailer approaches the sensor, it will begin to be sensed when it is about 12 feet away from the sensor. Where large trucks have axle separations between the rear axle of the tractor and leading rear axle of the trailer of about 45 feet or so, this leaves an intra-axle region of about 21 feet where vibrations are below the discrimination threshold. A separation distance between a front axle and a leading rear axle of a tractor is on the order of about 25-30 feet, while trailers including modular shipping containers have intra axle distances of less than 45 feet. Thus, it is anticipated a longest intra axle distance will be about 45 feet or so, leaving a length of about 21 feet between trailer axles where vibrations will not be registered by Applicants' system. While there is a known propensity of some truckers to "tailgate", it is believed that most such tailgating occurs at distances that are longer than 21 feet at highway speeds, particularly when crossing a bridge. The time duration of this largest intra-truck axle-to-axle separation distance at vehicle speed may be used to establish a maximum intra-truck axle time, which is defined herein as a maximum time period during passage of any truck between encountered peaks in a succession of very near field block variances associated with axle closest transits. A useful variant embodiment is a related maximum intra-truck null time which is defined herein as a maximum time period during passage of any truck in which a block variance will be less than the discrimination threshold level. In other words, a very near field block variance will be zero during passage of a truck only between axles when a sensor is outside the very near fields of wheel vibration sources, i.e. 21 feet for a 45 foot axle spacing, or about 12 feet from any discrete wheel or axle. When a very near field block variances continue to be zero longer than a maximum intra-truck null time, this indicates that a truck being weighed has moved past a location of a vibration sensor and truck weight can now determined based on a current summation of the block variation values. Immediately upon determining and then communicating truck weight to an appropriate external site (for example, to a database log to and/or to a bridge office alarm), the summation register is re-zeroed in anticipation of a next vehicle. This vehicle distinguishing scheme should work more reliably with a directly-underneath-the-wheel-track very near field embodiment.

More capable indirect methods for distinguishing individual vehicles and thereby appropriately starting and stopping block variance summation are also contemplated in the scope of invention. These may include, but are not limited to, truck configuration "signature" methods in which, for example, a succession of block variance peaks detected during vehicle passage is probabilistically matched with known standard fleet truck axle configurations. An example of a truck axle signature is displayed in FIG. 1b in which each spike in the sequence of block variances coincides with passage of wheels of an axle of a truck, in this case an 5-axle tractor trailer combination. This time signature may be converted using vehicle speed to an axle spacing distribution for comparison with known standard axle distributions. Additional probabilistic information, especially for vehicles of primary interest such as heavily loaded trucks, may be included in logic for improved vehicle distinguishing reliability. Such information may include, for example, observations that tractor front axle loading of a heavily loaded tractor-trailer combination is usually light relative to trailer axle loading, and further that a heavy payload is usually loaded with a forward bias in the trailer in order to gain the safest truck steering and dynamic characteristics, so a highest peak of block variance should be generally over the rear axles of the tractor. Incorporating this information in the distinguishing logic, for instance, leads to individual load envelopes that bracket highest load spikes and are separated at or between lowest load spikes (assuming two closely-following vehicles).

In another scheme, by modestly increasing the block size, and possibly sampling rate, for instance to 300-500 samples or more, an envelope of axle block variances may be developed (dashed line in FIG. 1b), with a highest peak of the envelope corresponding to the heaviest axle or wheel/wheels. Such peaks within an envelope may be used to discriminate between closely spaced trucks by associating the spikes under an envelope with axles or wheels of a single truck. Here, a fairly low threshold under the envelope, such as threshold Ti of FIG. 1b, may be used to discriminate vibrations from a single truck. In some instances, level of such a threshold may be set so as to possibly be higher than an expected weight of a front axle of a following truck, as an overweight situation is typically going to arise from the trailer being overloaded. In other situations where two envelopes overlap due to tailgating of a following truck, a high spike, such as spike S4 of FIG. 1b, followed by a short spike, such as spike S5, may be used to discriminate between the rearmost wheels of a loaded trailer and front wheels of a following truck. In yet other situations, a high spike followed by a low spike may be used to designate a division between the two envelopes. It should also be noted that by using appropriately selected thresholds, discrimination between trucks, particular large, heavy trucks, will occur in virtually all situations at highway speeds due to the small area around a sensor that is registered or measured by Applicants' system, which is optimized to predominantly measure those vibration waves propagating directly downward from a truck wheel. This provides a relatively high degree of resolution for the system. For instance, at 60 MPH, a truck will travel 88 feet in one second. Length of large trucks with 45 foot trailers may be on the order of 90 feet or so. As shown in FIG. 1b, a time span of spikes exceeding threshold T1 is slightly less than half the total length of the 2 second span of variance measurements of FIG. 1b, indicating that the spikes exceeding threshold T1 are representative of a single truck. In this instance, an appropriately selected threshold without an envelope may be all that is required to discriminate between trucks. Such a truck discrimination algorithm may run concurrently with and cooperate with a weight determining algorithm by identifying those spikes that exceed a low threshold as belonging to a single truck, and performing weight determining algorithms on those identified spikes. Where a processor speed is sufficiently fast, which should be well within processor capability today, a single processor may be used to implement both algorithms during passage of a single truck, or a pair of processors may be used, each performing one of the algorithms.

Further refinement of the logic may be achieved, for example, by incorporating additional information such as a maximum truck/tractor-trailer length, a maximum inter-axle separation distance (as previously described) and the observation that truck following distance will typically increase with speed (especially on a bridge).

In other logical embodiments, it is anticipated that distinguishing heavily loaded trucks using such a probabilistic-based logic will work well for most bridge applications. However, in situations in which a bridge is heavily used, and particularly during rush hours, frequent congestion-caused traffic slow downs and unusually short following distances may prove problematic even for the techniques previously described. An embodiment capable of handling such an unusually difficult application may use at least one vehicle proximity sensor of sufficient precision and response time, and disposes a proximity sensor, such as an optical beam producing and beam sensing device that can detect a front and rear of a truck, so as to distinguish an end of a leading truck as it moves beyond a very near field distance of a vibration sensor. During a period of time in which a proximity sensor detects presence of a truck, very near field block variances associated with that truck continue to be input into a summation register for subsequent inclusion into a total weight determination for a leading truck. As soon as a proximity sensor indicates that the end of a leading truck has passed a very near field distance beyond a downstream vibration sensor, block summation is terminated and a summation register total is communicated for weight determination of the passed leading truck. The summation register is then zeroed (along with initializing other variables) in preparation for weighing of a next vehicle. In this embodiment, the proximity sensor would need to be accurately synchronized with a measurement field of an associated vibration sensor so that a beginning or end of a truck is detected concurrently with the truck passing into/out of a measuring range of the system. In yet another embodiment using proximity sensors, a proximity sensor is additionally disposed upstream from a vibration sensor by a very near field distance, i.e. 10-12 feet or so, to also initiate summation of block variances. Note that embodiments utilizing such vehicle proximity sensors may also be conveniently used with portable units and/or with temporary applications, in particular, those in which a vehicle speed sensor is also being used. One particularly accurate proximity sensor is one utilizing a beam of light and a photodetector positioned so that the beam of light is broken just as a front/rear of the truck passes into/out of a measurement zone of a sensor. In addition, the proximity sensor may be set for detection slightly within a measurement zone of a sensor, and used to initiate sampling for block value computations.

The so deployed proximity sensors may be of any type operative to detect a front or end of a passing vehicle and of a type and configuration that can be mounted to available bridge structure. A proximity sensor may be, but is not limited to, a type using optical or magnetic sensing. Such a proximity sensors may be mounted to bridge structure via a permanent mounting, via temporary attachment thereto or even simply setting a portable unit to one side of traffic lanes.

Coefficient of Proportionality

With all embodiments of the invention, weights of vehicles are determined by multiplying a ratio of a sum of block variances to vehicle speed by a coefficient of proportionality. This coefficient of proportionality may be determined through calibration runs with a vehicle of known weight moving across a bridge at a known speed. This calibration procedure can simultaneously help establish a very near field reference threshold value for computing very near field block variance as well as establishing a threshold value used for computing vehicle speed from vibration sensor signals in which sensors are located at two locations of known longitudinal separation distance, as discussed above.

Another aspect contemplated within the inventive scope includes adjusting a coefficient of proportionality depending on various aspects of a particular bridge application. One such adjustment may be made for an application to different bridges having different deck pavement materials and/or thicknesses, such as would be required for applications with a portable system. In such cases, the coefficient of proportionality is equal to the product of a calibration constant for a reference pavement design and an adjustment factor that accounts for differences with said reference pavement design. This adjustment may be accomplished via direct input of an appropriate coefficient of proportionality, or alternately, inputs of bridge vibration-related physical attributes such that an appropriate coefficient is computed or selected from a look-up table. Other adjustments to the coefficient of proportionality contemplated may include those required by changes of moisture content and/or temperature of a bridge deck pavement. These adjustments may be made based on direct sensing of pavement moisture content and/or direct sensing of pavement temperature, and these data used for computing or looking up the needed coefficient.

DETAILED DESCRIPTION OF INVENTIVE EMBODIMENTS

Figure 2A:
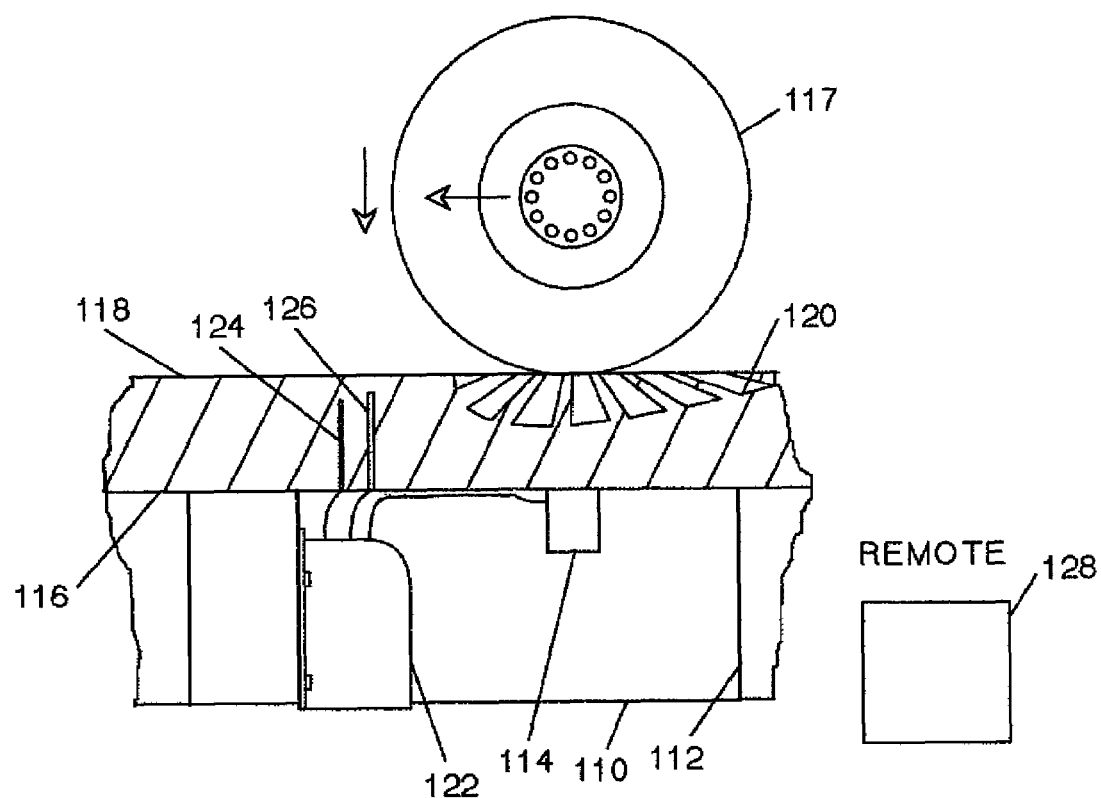
FIG. 2a illustrates one embodiment wherein low frequency pavement vibration generated by a moving vehicle wheel propagates in a section of a bridge deck pavement and is sensed by a discrete location vibration sensor mounted on the lower surface of the bridge deck pavement.

A representative inventive embodiment especially useful for a permanent bridge installation is depicted in FIG. 2a, which displays a representation of a wheel 117 of a truck crossing a section of bridge deck 110 formed by support girder structure 112 and pavement 118. Orthogonally-oriented vibration sensors, or a vibration sensor oriented to sense only vertically propagating vibrations, are deployed in a single housing 114, the housing being solidly and rigidly attached in intimate contact to pavement lower surface 116 of pavement 118. With this installation of sensors, very near field low frequency pavement vibration waves 120 generated from a wheel 117 of a vehicle moving along pavement 118 propagate generally downward in body waves through pavement 118 and impinge on lower surface 116 of pavement 118. Such vibration waves are mechanically coupled directly to sensors 114 as noted above. Also as noted above, attachment of vibration sensors 114 may be by a solid adhesive bonding interface, but functional coupling may also be achieved by fasteners or by any other fastening method or device that intimately attaches sensors 114 to lower surface 116 of pavement 118 for coupling very near field pavement vibrations to sensors 114. As depicted in FIG. 2a, a pavement temperature sensor 124 and a pavement moisture sensor 126 may also be incorporated in Applicants' system. Output signals from all sensors are conveyed to a communication module 122 that may be attached to any convenient structure of the bridge. Communication module 122 in turn conveys sensor output signals to a computing device 128 that may be located remotely from bridge, or the signals may be stored locally for later analysis.

Figure 2B:
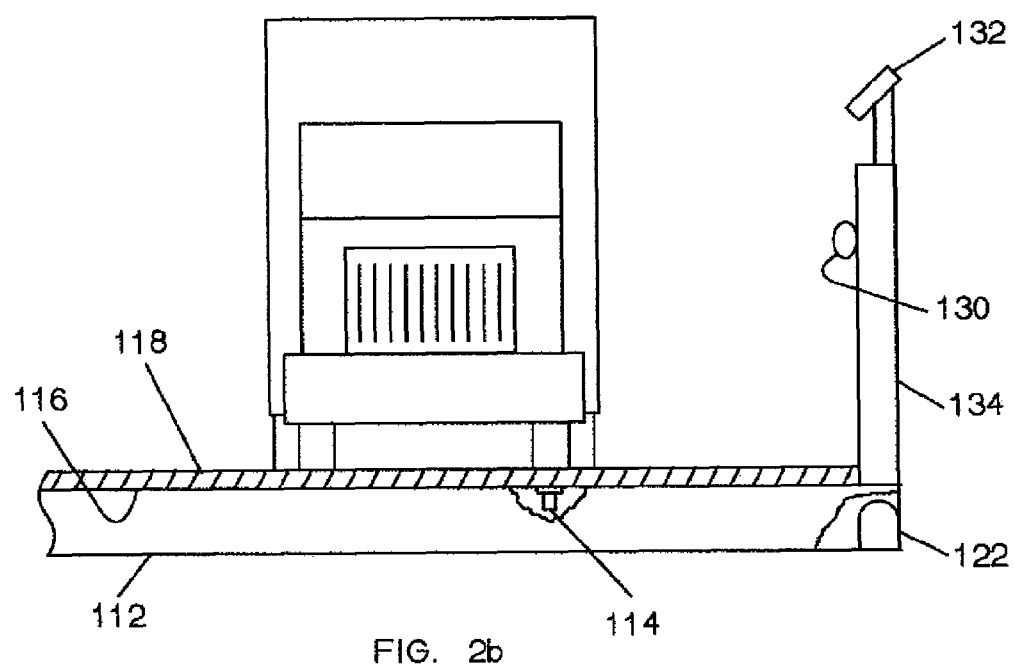
FIG. 2b illustrates another embodiment that additionally uses a vehicle proximity sensor and a vehicle speed sensor.

A representative inventive embodiment especially useful for a temporary bridge installation is depicted in FIG. 2b. In addition to items and features of the embodiment depicted in FIG. 2a, a vehicle speed sensor 130 and vehicle proximity sensor 132 are shown here as being temporarily attached to bridge side rail 134.

A section of a two-lane bridge 311 having one lane of traffic in each direction is shown in planar view from above with a representation of a crossing truck in FIG. 3. This view shows an example of a mid-lane embodiment utilizing two sets of 3-axis accelerometers, 114 in each lane of the bridge.

A section of a two-lane bridge 411 having both lanes of traffic in the same direction is shown in planar view from above with a representation of a crossing truck in FIG. 4. This view shows an example of a directly-underneath-the-wheel-track embodiment utilizing accelerometers 114 mounted underneath the outside wheels track in each bridge lane.

Figure 5:
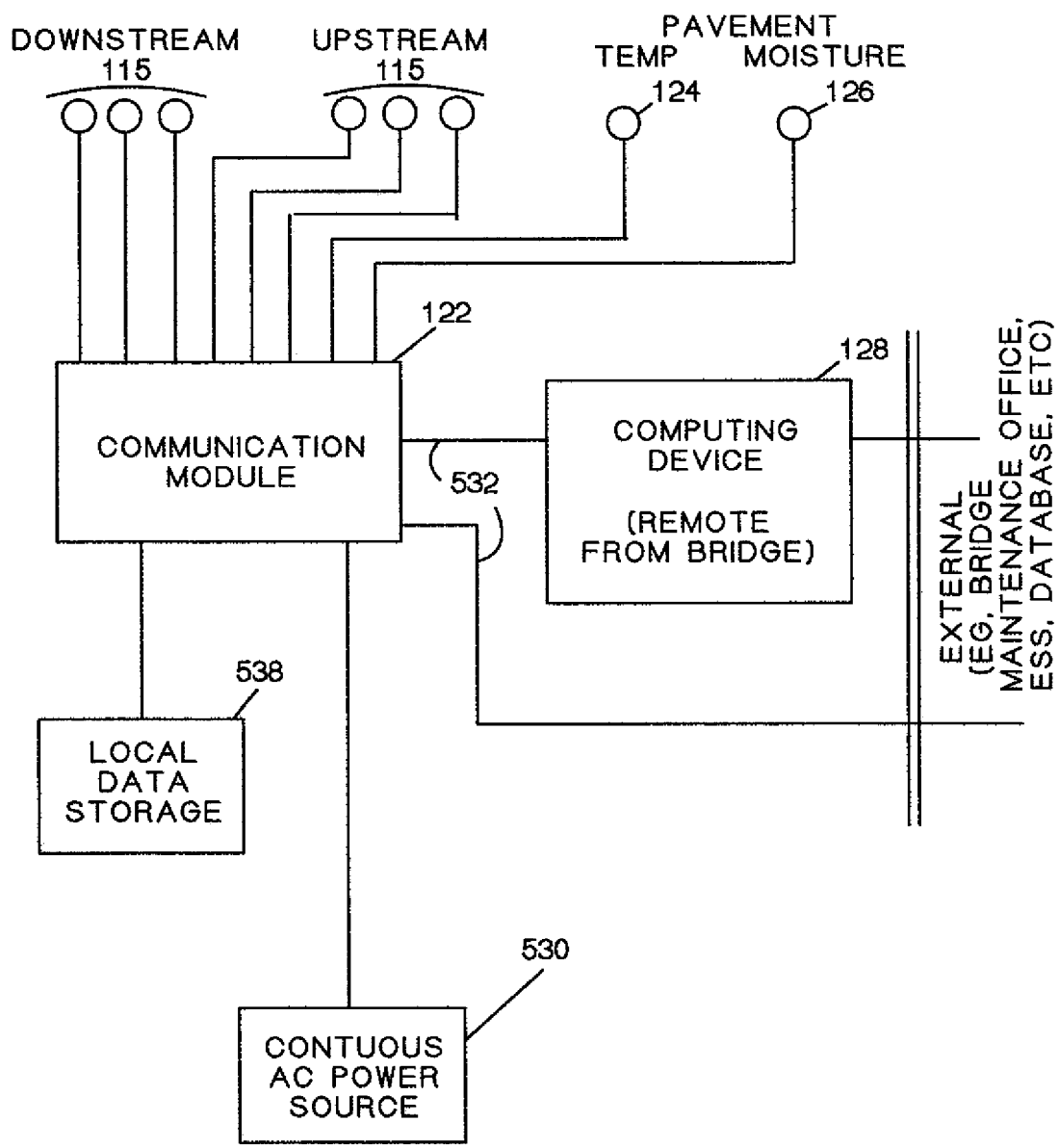
FIG. 5 is an electrical block diagram of a measurement system of one embodiment of the invention.

FIG. 5 is an overall electrical block diagram of a measurement system of one embodiment of the invention. As schematically represented in FIG. 3 for a single lane of the embodiment, output signals of accelerometer/accelerometers 114 at a site #1, accelerometer/accelerometers 114 at a site #2, a pavement temperature sensor 124, and a pavement moisture sensor 126 are conveyed to communication module 122 (FIG. 5). In the embodiment depicted in FIG. 2a, this conveyance may be via electrical cable to local communication module 122 mounted on bridge deck girder structure 112, although other communication methods may be used, such as fiber optics or wireless communications systems. As further shown in FIG. 5 for this embodiment, communication module 122 may directly store sensor output data into local data storage 538 for later communication and processing. Data storage 538 connected to module 122 for each lane of traffic may be a 1 Gbyte flash RAM module capable of storing approximately twenty-four hours of data.

Real-time data represented in sensor output signals is conveyed to a computing device 128, and may be conveyed to other external locations, such as a bridge maintenance office via a fiber optics or other communications link 532, such as a wireless or conventional cable means are also possible. Not shown in FIG. 5, but contemplated in the scope of the invention, are calibration interface units between the communication module or the remote processing unit and any available Electronic Screening System (ESS) facility. In another embodiment, an indication of an overweight truck may be provided to a recording imaging device, such as a camera used at intersections to capture and image license plates of vehicles that run red lights and make improper turns, for the purpose of recording a license plate or other identifying indicia of an overweight truck. The embodiment displayed in FIG. 5 further indicates that the communication module 122 may be powered via connection to a continuous AC power source 530. Other embodiments would include systems powered by battery based systems; the batteries being either replaceable or rechargeable, such as batteries recharged by a solar voltaic system attached to bridge side rails 134 or other bridge superstructure.

Functions of computing device 128 include isolating components of vibration sensor outputs corresponding to a low frequency range of interest via a low-pass filter, determining elapsed time between signal features of site #1 and site #2 accelerometers 114, computing vehicle speed with elapsed time and the known separation distance between site #1 and site #2, sampling and inputting samples into sample blocks, computing corresponding block variances, summing block variances and finally determining weight of a vehicle by multiplying the ratio of the sum of block variances to vehicle speed times a coefficient of proportionality predetermined for a particular application. These computation steps are shown in block diagram in FIG. 6 and FIG. 7. A processor of this embodiment may adjust the coefficient of proportionality according to pavement temperature, pavement moisture content, pavement type and thickness.

Computation and Logic Flow

Figure 8:
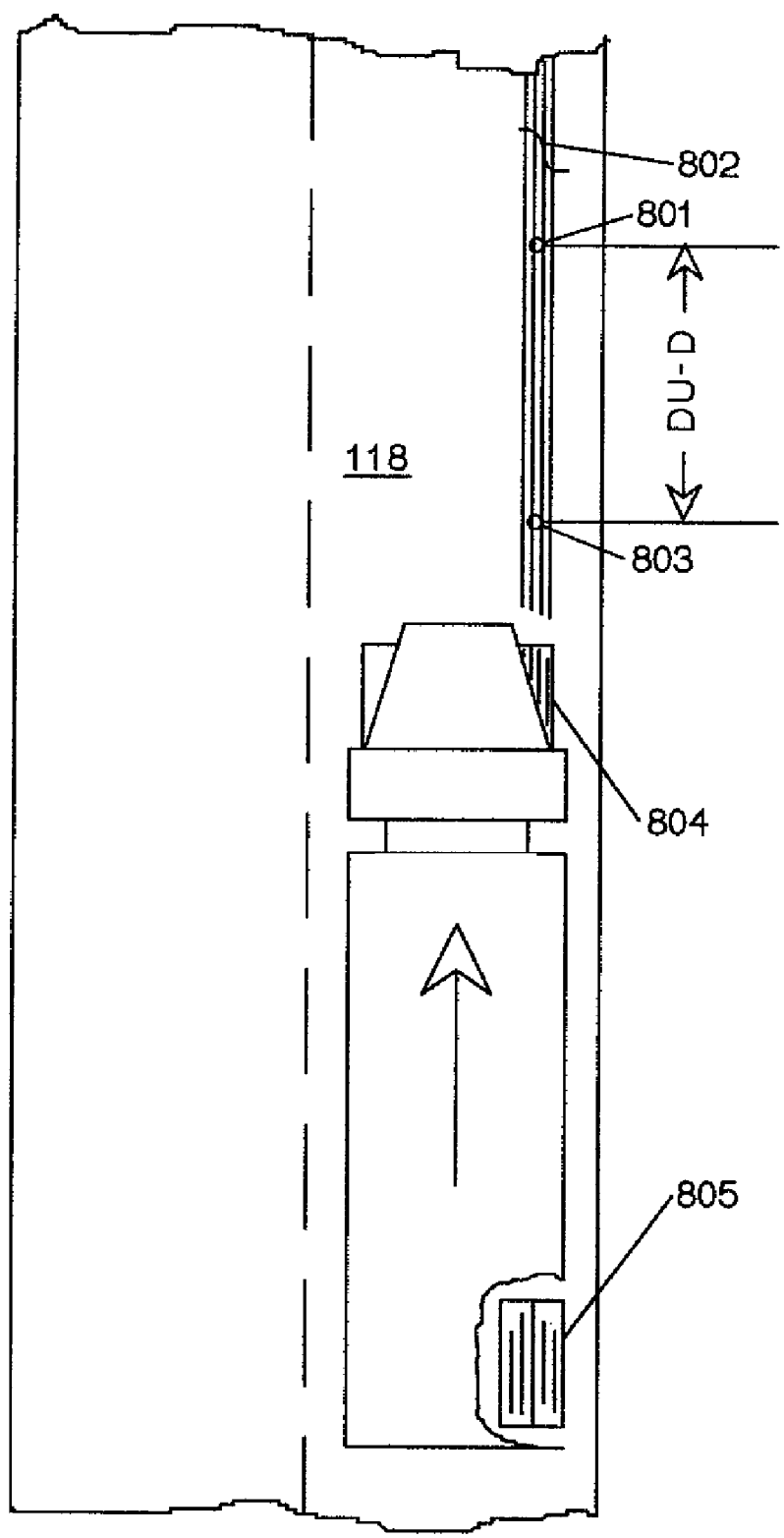
FIG. 8 illustrates low frequency structural vibration-measuring sensors located at two locations of known separation distance for calculating speed of a vehicle.

A computational device for implementing any of Applicant's methods may be a general purpose computer running a conventional operating system, such as LINUX or WINDOWS, in conjunction with Applicants' methods in order to generate maintenance alerts. In other instances, a specialized computer using a RISC (reduced instruction set computer) processor and possibly a near-real time operating system such as one implemented by KADAK, AMX, or a condensed version of Windows or Linux may be used. In this latter instance, it may be desired to receive alarms immediately and respond to them, as by automatically triggering an imaging or similar device to record a license plate or image of an offending vehicle. In this instance the program may be implemented as a combination of software and firmware where certain repetitive operations, such as calculating speed, may be imbedded in firmware while operations requiring several decisions, user responses, inputs or the like may be implemented by software. In any case, a programmer skilled in the appropriate arts would know what type of computer and operating system to use depending on design requirements of the system. For purposes of illustrating logic flow, an example embodiment is displayed in FIG. 8 in which a single accelerometer 801 is mounted on a lower surface of bridge pavement 18 directly underneath a wheel track 802, and a second accelerometer 803 is mounted on a lower surface of bridge pavement 18 directly underneath wheel track 802 a known distance D upstream from accelerometer 801. It is further assumed for purposes of illustration that a vehicle to be weighed is a heavily loaded truck.

Figure 6:
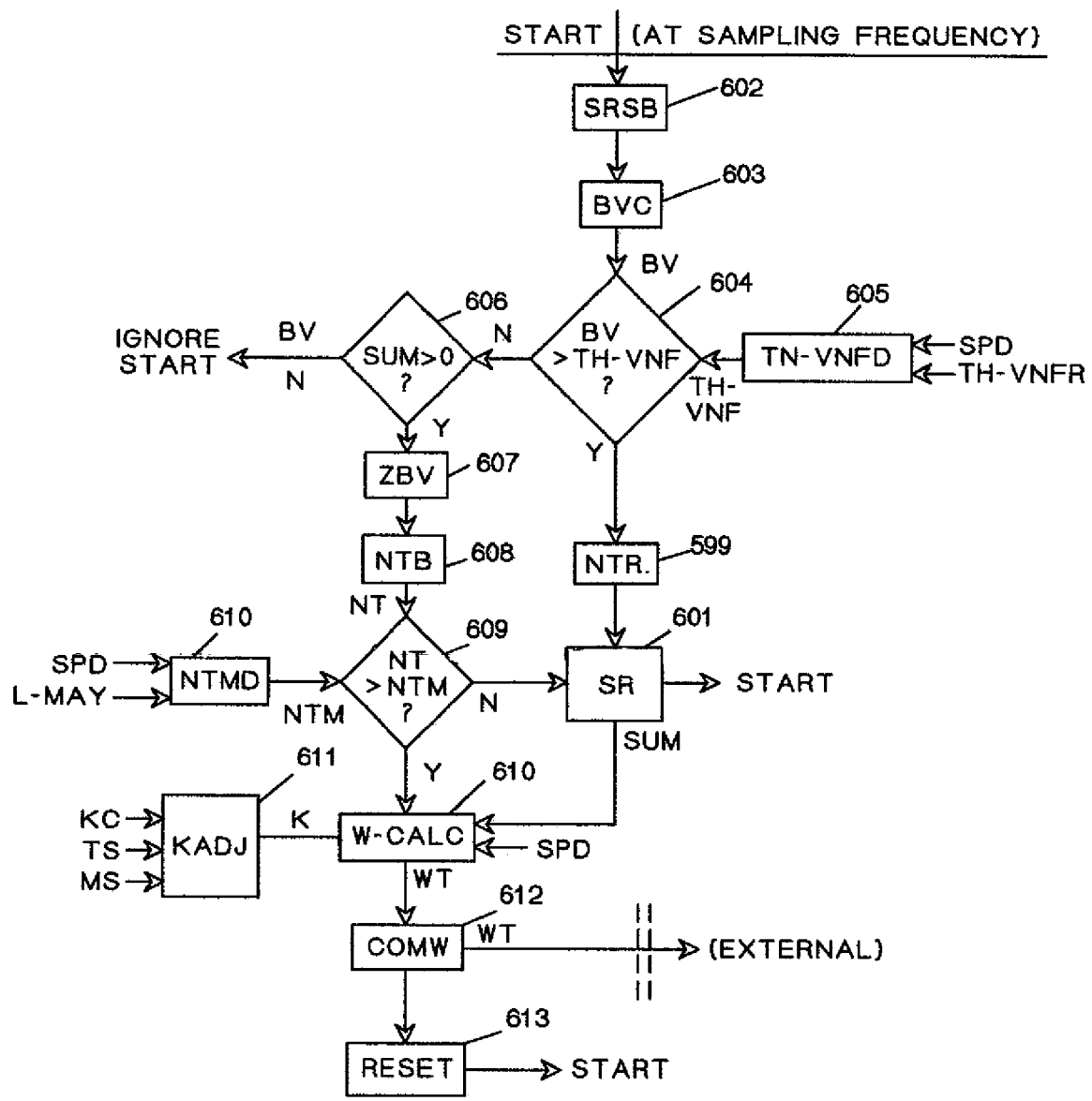
FIG. 6 is a flow chart illustrating logic flow of one embodiment of the invention.

FIG. 6 is a block diagram showing an example logic flow scheme for measuring vehicle weight for one embodiment of the invention. This logic flow occurs as wheels of the truck pass over one vibration sensor. It is important to note that only a single sensor is needed to determine weight where speed is directly determined, such as by a radar detector, which is capable of very accurately determining speed. In other embodiments using a single sensor, a rise and fall time of the signal from the single sensor may be used to determines speed, although such a measurement may not be as accurate as a two sensor or direct measurement system. As will be described below, another related example of a computation logic flow scheme is presented in FIG. 7, for determining the speed of a moving vehicle using low frequency pavement vibration measuring sensors located at two locations at a known separation distance. In this embodiment, a distance between the sensors should be as short as possible in order to more accurately determine an average vehicle speed between the sensors. As software, and possibly the sensors, will be optimized to detect very near field vibrations within a radius of about 10-12 feet or so, spacing between the sensors should be at least about 25 feet or so, and possibly somewhat more to prevent the system from registering vibrations from the same truck tire simultaneously by the separated sensors. For purposes of illustrating computational logic flow schemes of FIG. 6 and FIG. 7, an example method embodiment is displayed in FIG. 8 in which a single accelerometer 801 is mounted on a lower surface of the bridge pavement 18 directly underneath a wheel track 802, and a second accelerometer 803 is mounted on the lower surface of the bridge pavement 118 directly underneath the same wheel track 802 a known distance D in a direction opposite to the direction of vehicle travel. It is further assumed for purposes of illustration that a vehicle to be weighed is a heavily loaded truck. In these examples, a processor speed of a computer performing computations is significantly faster than a sampling rate of the vibration sensor output signals such that all sequences of logical steps are completed well within a sensor measurement sampling time cycle.

The vehicle weight computation scheme of FIG. 6 is discussed first. It is assumed that the previous vehicle has passed and block 601, Summation Register SR, has been reset such that its value, SUM=0 and that vehicle speed, SPD provided to box 610, for the next approaching truck has been determined. In use, such speed determination by a two-sensor system would occur after at least a front axle, or some other recognizable attribute, has passed the downstream sensor, after which a weight calculation would be performed. Prior to such speed determination, calculated and measured values would be stored in temporary memory storage registers for retrieval after speed has been determined. As the truck's front-most wheel 804 (FIG. 8) approaches a nearest transit of accelerometer 801, an output signal of accelerometer 801 increases in amplitude. At block 602, signal receiving-sampling block SRSB receives an output signal of accelerometer 801 and samples the signal at a sample rate of 500 Hz and sequentially inputs these samples into block 603, block variance computer BVC. In accordance with conventional digital processing, the samples taken at block SRSB may be digitized, as by an A/D converter, or converted to a digital signal at the vibration sensor. With each sample, BVC block 603 passes an updated block variance value BV to query box 604, where the question is asked as to whether the block variance value is above a very near field block variance threshold TH-VNF. TH-VNF is determined in block 605, TH-VNF-D from a determined speed of the truck (SPD) and a preselected reference value, TH-VNFR. As noted above, this reference value may be selected so as to set the threshold in accordance with a desired minimum weight the weighing system is sensitive to. In other words, where it is desired to weigh all vehicles over 5 tons, then the reference value would be set so that vehicles under 5 tons are not weighed. This reduces data storage and review requirements by only weighing those vehicles of interest and storing such data. Also as noted above, this reference value may be determined empirically during a calibration process wherein a truck of known weight is driven at a constant, known speed over the system of the instant invention. Of course, for statistical purposes, the threshold may be set so low so as to measure all vehicles of any significant weight, or so high so as to measure only heavily loaded trucks. In addition, this threshold may be adjusted upward or downward on the fly as needed in accordance with a determined speed. Here, a faster truck of a given weight develops vibrations of a greater strength than a slower truck of the same weight, which may require a lowering of the threshold for the slower truck and a raising of the threshold for the faster truck in order to maintain a discrimination or measurement distance around the sensor to 10-12 feet or so and adjust block value measurements so as to accurately calculate weight of the respective trucks.

Initially, the very near field of wheel 804 is outside a very near field measurement zone of accelerometer 801, and a computed block value will be below threshold TH-VNF, developing a NO answer at decision block 604. This directs logic flow to decision block null passage gate NPG 606, where the query is made as to whether a sum of block values is greater than 0. Because SUM=0, indicating that threshold TH-VNF has not been exceeded, the logic flow is directed to ignore the current block value BV and loop back to START. This sequence repeats until the moving very near field around the front truck wheel is within a sensing range of accelerometer 801 and a block value BV at decision block 604 exceeds TH-VNF. When this occurs, logic flow is directed responsive to a YES answer at block 604 to null time reset (NTR) block 599, which sets null time NT equal to 0, as will be described below. From block 599 logic flows to block 601 in which a current block value BV is input into summation register SR at block 601 such that a current SUM >0, and input block values are summed. Succeeding measurement cycles that exceed threshold TH-VNF continue in this sequence as sequentially updated block values BV are input into the summation register SR at 601 and a sum of the block values increases.

After front-most wheel 804 (FIG. 8) passes beyond the 10-12 foot sensing or threshold range of sensor 803 and the current updated BV drops below TH-VNF, logic block 604 again provides a NO answer, and logic flow is directed to block 606. Now the block value SUM >0, and block 606 directs logic flow to ZBV block 607, where the summed front wheel block value is stored, and summation register 601 is reset to 0 because the current block variance is below that required to qualify as very near field. Alternately, register 601 may retain its current sum of block values, and subsequent block values below the threshold simply ignored at box 606. From block 607 the logic flows to block 608, Null Timer Block NTB. Block 608 initiates null timer NT to run and count a number of sample cycles of sensor 803 after a wheel has passed in which no wheel is detected. From block 608 logic flow is passed to query logic block 609, where the question is asked as to whether the null timer has reached a null time maximum value NTM. NTM is predetermined in block 610, MNT-D, from a preselected L-MAX, a length, such as 21 feet as described above, related to a maximum expected intra-truck axle-to-axle separation and measurement length, and detected speed of the truck SPD. Because the first few null periods will occur when the sensor is outside of the very near field of a passed wheel and momentarily outside the very near field of the approaching next wheel, null time NT will be less than null time maximum NTM, and a NO answer is developed at block 609. Responsive to the NO answer, logic flow is passed to summation register block SR 601, and a block value BV>TH-VNF for the next wheel is input into summation register SR. Block values for this next wheel are again summed as they are input to register 601 and stored after the wheel has passed the sensor so that all the stored BV sums may be retrieved and summed after the truck has passed, or alternately summed with block values >TH-VNF for previous wheels, the total BV sum being maintained in register 601.

The above sequence of wheel very near field contributions to the block variance sum and between-wheel null periods alternate until the truck's rear-most wheel 805 (FIG. 8) passes beyond accelerometer 803 and the block value BV once again drops below threshold TH-VNF. While block values SUM >0, sequential sampling cycles leading to null timer NTB block 608 continue to index the null time NT until the null time NT exceeds null time maximum NTM at logic block 609. This occurrence corresponds with an instant that rear-most wheel 805 has traveled further from accelerometer 803 than a maximum expected intra-truck axle-to-axle separation or measurement length (21 feet or so) and accelerometer 803 has not measured the very near field low frequency pavement vibration generated by an approaching wheel. Because the null time NT>NTM, logic block 609, responsive to a YES answer, passes logic flow to block 610, W-CALC, which retrieves the stored sums of block values and computes the truck weight, WT, based on coefficient of proportionality K, this coefficient of proportionality determined by calibration, a sum of stored block variance SUMs and speed of the truck SPD. Coefficient of proportionality K is determined in block 611, K-Adjustment block, and provides a KADJ signal based on calibration, a predetermined KC and pavement temperature sensor signal TS and moisture sensor signal MS. Weight of the truck WT is then communicated at block 612, COMW, to an external destination which may be a logging data base and/or a bridge maintenance alarm system, or possibly to an imaging and storage device as discussed above. Logic then flows to block 613, RESET, in which all register values (except preselected values) are zeroed in anticipation of the next vehicle.

Figure 7:
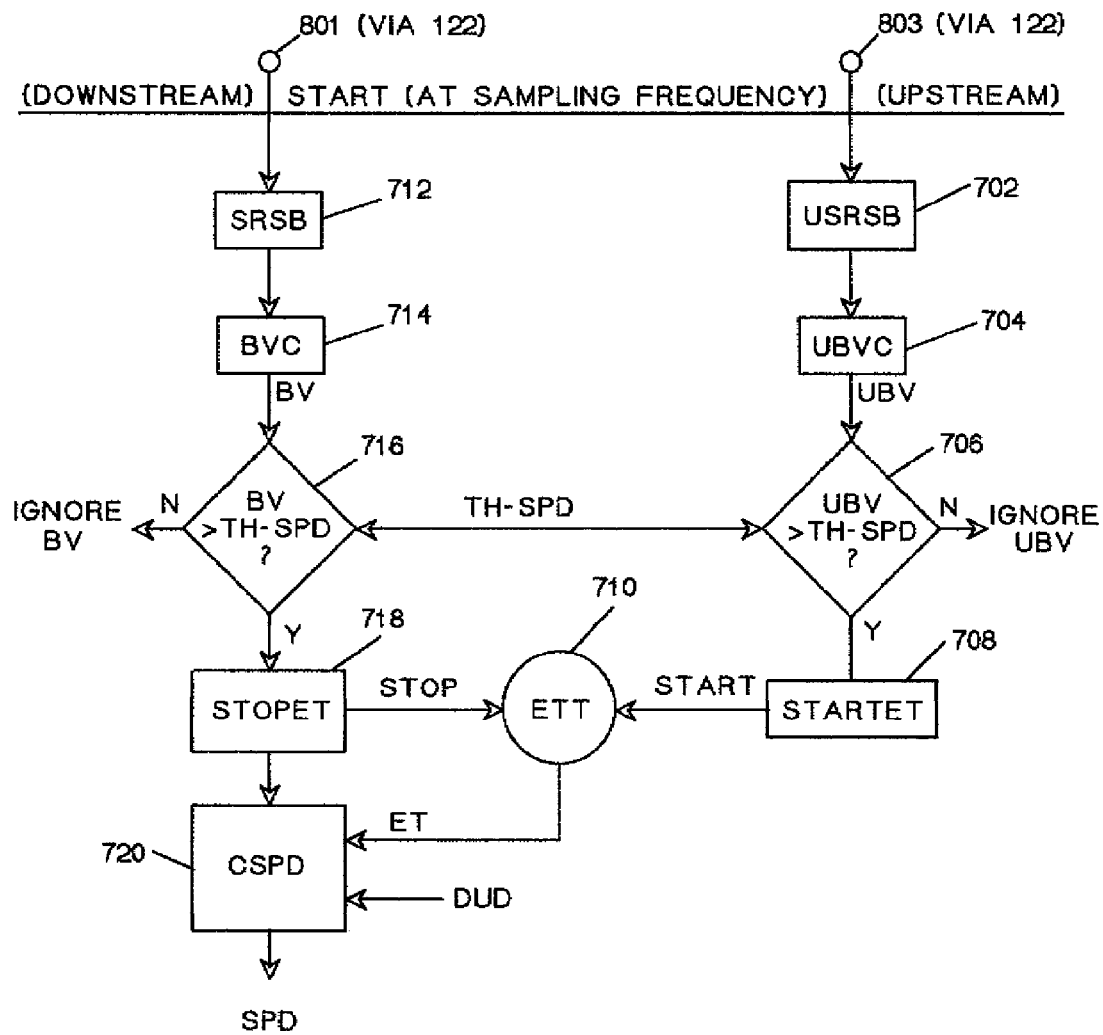
FIG. 7 is a flow chart illustrating logic flow for calculating speed of a vehicle in a very near field of the vehicle.

A related example logic flow and computation scheme embodiment illustrated in FIG. 7 for indirectly determining speed of a truck is now described. As shown in FIG. 7, the logic consists of somewhat parallel paths for accelerometers 801 and upstream accelerometer 803. It is assumed that the previous vehicle has passed, and registers have been reset. As a truck's front-most wheel 804 (FIG. 8) approaches upstream accelerometer 803, an output signal of accelerometer 803 increases in amplitude. Block 702, upstream signal receiving/sampling block USRSB, continuously receives the output signal of accelerometer 803, samples the signal at a sample rate of 500 Hz and sequentially inputs these measurement samples into block 704, upstream block variance computer UBVC where the block variance is calculated as described above. With each measurement sample input, the upstream block variance computer UBVC block 704 passes an updated upstream block variance UBV to decision block 706, upstream Speed threshold USPD-THG, where the query is made as to whether the updated block variance exceeds a speed threshold TH-SPD, a preselected value. Initially, the calculated block values UBV will be less than TH-SPD, and logic flow will be directed to ignore the calculated and updated block values UBV responsive to a NO at block 706, and the logic flow loops back to take another sample. With successive measurement cycles in which the front-most wheel 804 approaches nearer to upstream accelerometer 803, the block values UBV will continue to increase until the block values UBV exceed TH-SPD at logic gate 704, indicating the very near field of wheel 804 is at a specific point in a measuring range of sensor 803. At this point a YES is returned, and the logic flows to block 708, Start Elapsed Timer, STARTET, which starts an Elapsed Time Timer, ETT at block 710.

A similar progression of events occurs with downstream accelerometer 801, except slightly delayed by time taken by truck wheel 804 to move from sensor 803 to sensor 801. As wheel 804 approaches sensor 803, samples from signal receiving/sampling block 712 are provided to block value computer BVC at block 714. Updated downstream block values are passed to decision block 716, downstream Speed threshold DSPD-THG, where the query is made as to whether the updated block values exceed the Speed variance threshold TH-SPD, the same preselected value used in conjunction with decision block 706. Initially, block values BV will be less than the TH-SPD threshold and logic flow will be directed to ignore BV and loop back to take another sample. With successive measurement cycles in which the front-most wheel 804 and associated very near vibration field approaches downstream accelerometer 801, the block values BV will continue to increase until the block values BV exceed the TH-SPD threshold at decision box 716. At this point, tire 804 and its corresponding very near vibration field is at the same point with respect to sensor 801 as a point where the threshold was exceeded at sensor 803. The logic is then passed to block 718, Stop Elapsed Timer, STOPET, which stops ETT Timer 710. Logic then flows to block 720, Compute Speed, CSPD, which computes vehicle speed based on DUD, a preselected input of the longitudinal separation distance between accelerometers 801 and 803, and ET, the elapsed time from ETT Timer 705. As described, a so-computed speed is used in a weight calculation of FIG. 6.

Figure 9A:
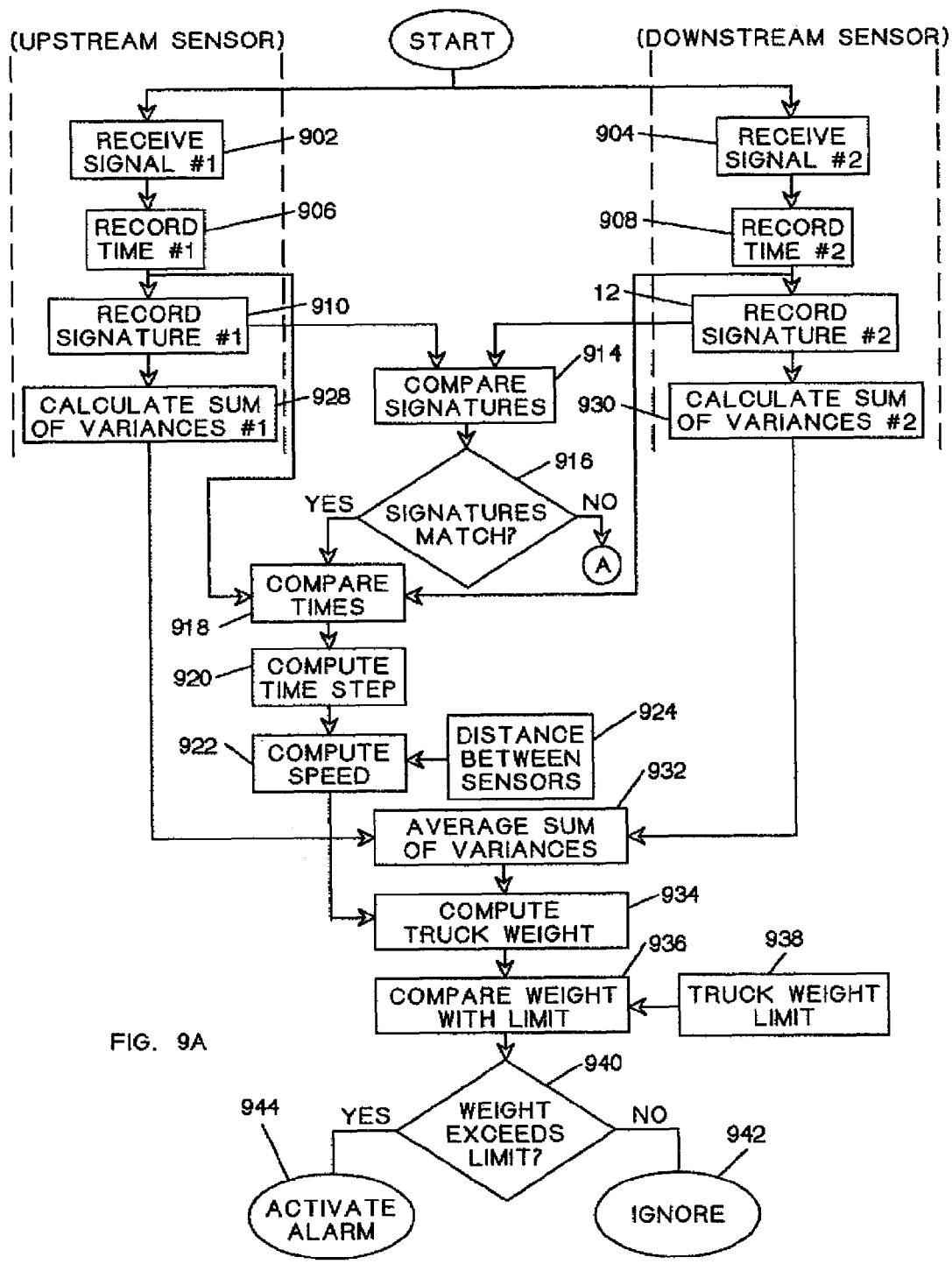
FIGS. 9a-9c illustrate block diagrams of another logic process for determining weight of a vehicle.
Figure 9B:
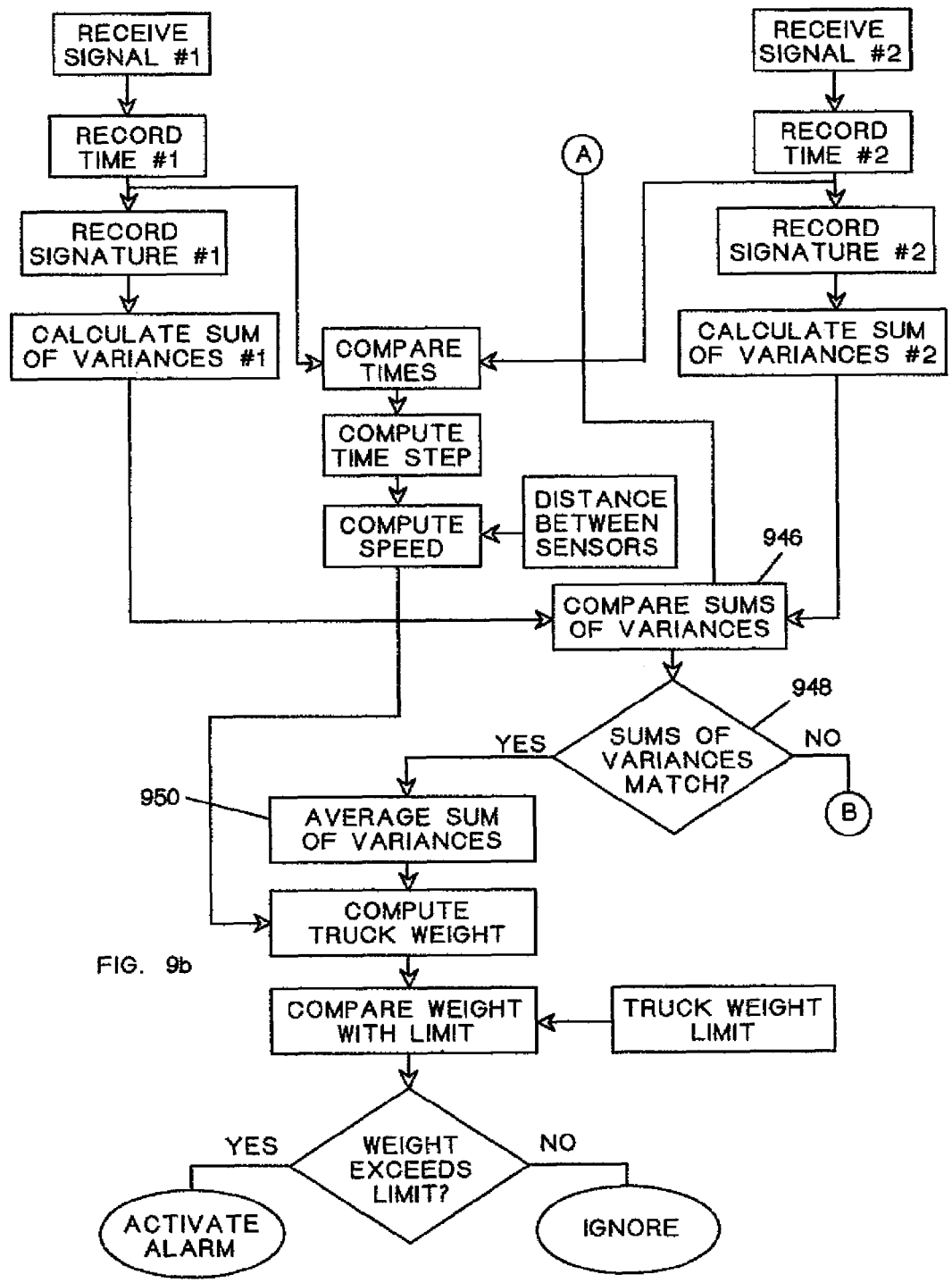
Figure 9C:
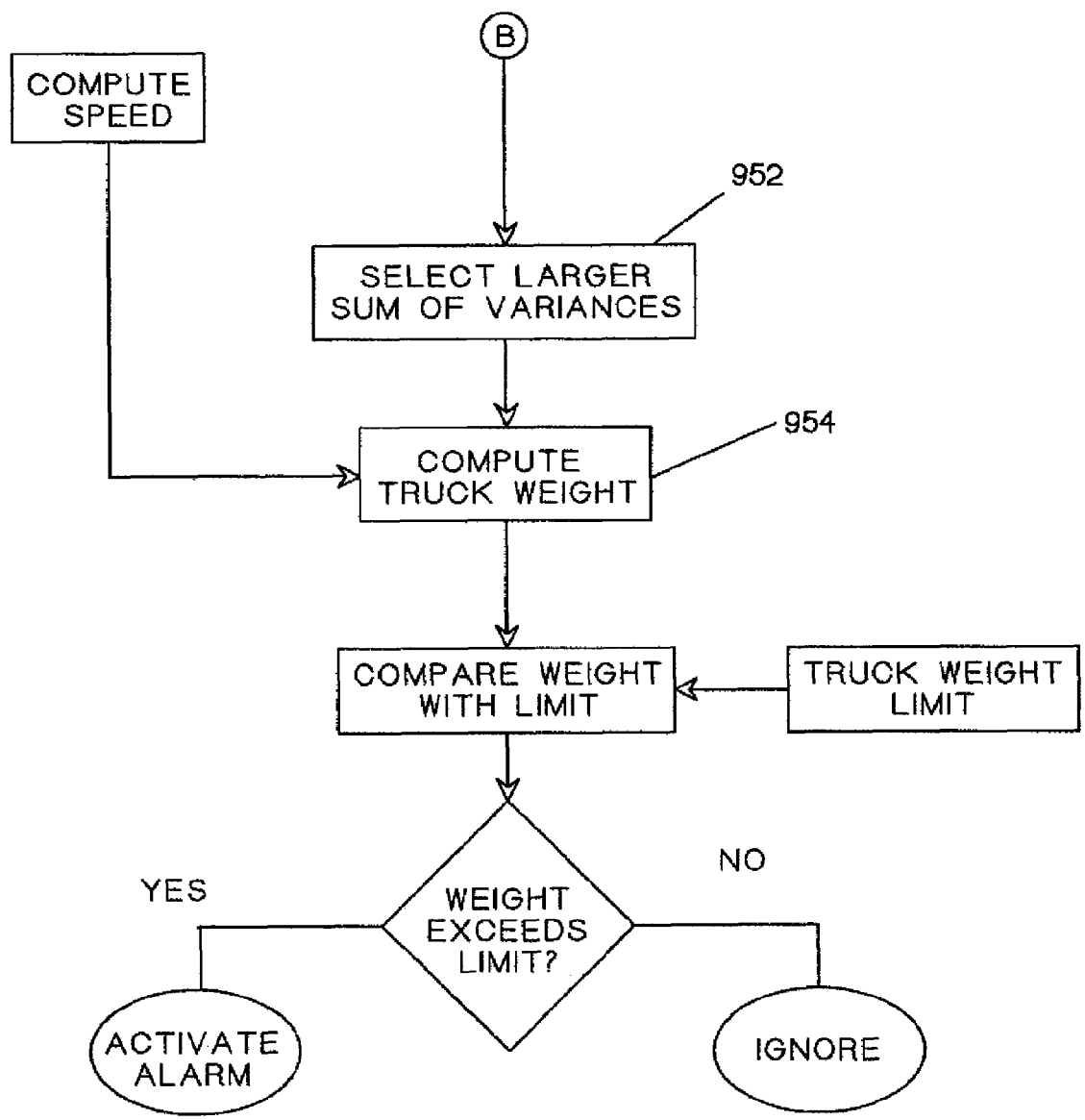

FIGS. 9a, 9b and 9c are block diagrams showing another logic flow scheme for determining weight of a vehicle. In these examples, processor speed for performing logical operations should be significantly faster than a sampling rate of vibration sensor output signal such that all sequences of logical steps are completed well within a sensor measurement sampling time cycle.

Logic flow for vehicle weight computation as shown in FIG. 9a is now discussed. Here, after initialization of computer or computing device 128 of FIG. 5, at boxes 902, 904 very near field vibrations are received by the first, upstream sensor at box 902 followed by reception of very near field vibrations from the downstream sensor at box 904. Times of reception of these vibration signals are recorded respectively at boxes 906, 908, and the signatures of the signals are recorded at boxes 910, 912 respectively. At box 914 the recorded signatures are compared, as by any number of correlation or comparison processes, and the query is made at box 916 as to whether the signals show a correlation or match. Such a comparison or correlation will precisely indicate a time of passage of the truck tire by a correlation spike. If the answer is YES, indicating that the same truck tire has passed over the two sensors, then the logic flows to box 918, where times are compared and a time the tire took to travel between the sensors computed at box 920, followed by speed determination at box 922 using a known distance between the sensors from box 924.

At boxes 928 and 930 block variances from each sensor may be calculated as described above, and averaged at box 932. Such a block value average may provide a more accurate determination of weight than methods that use only one measurement. The averaged block value is provided to box 934, where weight of the truck is calculated as described above. At box 936 the calculated truck weight may be compared with a truck weight limit of the bridge from box 938, and at decision box 940 the query is posed as to whether the calculated truck weight exceeds the weight limit. A NO answer at box 940 causes the weight to be ignored at box 942, while a YES answer to box 944 triggers an alarm, makes an entry into a log file, used as a trigger event for imaging or otherwise recording the truck and/or license plate. Here, as some license plates may include bar codes, a bar code reader may be triggered to immediately identify the truck and send the offending truck's information to a central location or appropriate authorities.

For providing increased robustness of the system, and at box 916, a NO answer, indicating a match between the wheel signatures is not found, causes the logic flow to fall through to box 946 of FIG. 9b. This process is substantially as described for FIG. 9a except for boxes 914 and 916 wherein signature comparisons of a wheel taken by spaced sensors is omitted. At box 946 the sums of variances from the two sensors, calculated as shown and described above, are compared, and a result provided to decision box 948 where the query is asked as to whether the sums of the variances match within a relatively narrow limit, such as within 2-5 percent or so. If the answer is YES, then at box 950 an average of the two variance sums is taken, and the logic proceeds to boxes 934-944 as shown in FIG. 9a. As such, the process of FIG. 9b, if wheel signatures are not found, such as where a road surface becomes damaged or debris is present at one sensor location, will still serve to determine vehicle weight.

For furthering redundancy and robustness, if the sum of variances at box 948 does not match within the 2-5 percent margin, and a NO is provided at box 948 of FIG. 9b, then the logic falls through to box 952 of FIG. 9c. Here, the larger variance of the two calculated variances at boxes 928, 930 of FIG. 9a is selected, and truck weight is calculated at box 954, and the logic proceeds as described for boxes 936-944 of FIG. 9a. In this instance, even where a comparison of the two variances taken at boxes 946, 948 of FIG. 9b fails, then weight of a truck is still obtained.

The above described computation logic flow presents the main features and tasks related to this embodiment of the invention. Not shown or described are many supporting tasks and features, typically known by those skilled in the programming art as "housekeeping", and the purpose of their absence from the disclosure is for achieving disclosure clarity. Examples of these include, but are not limited to, such tasks as preventing subsequent speed calculation during passage of following vehicle wheels of a vehicle being weighed, and restarting speed determination if the speed calculation process is triggered and yet no subsequent and associated very near field block variance is subsequently detected (as would occur, for example, with a vehicle not of interest because of modest weight but yet traveling at high speed).

Having thus described our invention and the manner of its use, it should be apparent that incidental changes may be made thereto that fairly fall within the scope of the following appended claims, wherein we claim:

The invention claimed is:

1. A method for determining weight of a vehicle moving on a bridge, said bridge having a pavement with an accessible lower surface, said method comprising;
   directly coupling downwardly travelling low frequency pavement vibrations generated by one or more wheels of said vehicle moving on said pavement, said body waves propagating generally downward through said pavement to at least one discrete location vibration sensor responsive to said downwardly travelling low frequency pavement vibrations, said at least one discrete location vibration sensor directly mounted to said lower surface of said pavement generally underneath a lane traveled by said vehicle,
   using said at least one discrete location vibration sensor to sense said downwardly travelling low frequency pavement vibrations generated by wheels of said vehicle moving on said pavement
   computing weight of said vehicle comprising using sensed said downwardly travelling low frequency pavement vibrations wherein the low frequency vibration are in a range of about 0.5 to 100 Hz.

2. A method as set forth in claim 1 wherein said computing weight of said vehicle further comprises computing energy rate of said downwardly travelling low frequency pavement vibrations, and determining vehicle speed, said vehicle weight being determined by a ratio of said vibration energy rate to said vehicle speed.

3. A method as set forth in claim 2 further comprising;
   mounting two discrete location vibration sensors to said lower surface of said pavement, said two discrete location vibration sensors separated by a known distance along said lane travelled by said vehicle,
   using said known distance to compute said vehicle speed,
   computing weight of said vehicle as a product of a coefficient of proportionality times a ratio of computed said signal energy rate to computed said vehicle speed.

4. A method as set forth in claim 3 further comprising computing a very near field signal energy rate representative of an energy rate of very near field low frequency pavement vibration sensed during a time period in which said one or more wheels of said vehicle are within about 12 feet of at least one of said two discrete location vibration sensors.

5. A method as set forth in claim 3 wherein said mounting said two discrete location vibration sensors at two locations further comprises mounting said two discrete location vibration sensors underneath a track of said one or more wheels of said vehicle, and said computing said signal energy rate representative of said energy rate of said low frequency pavement vibration further comprises computing a very near field signal energy rate representative of an energy rate of said very near field low frequency pavement vibration sensed during a time period in which said one or more wheels are within about 4 feet of at least one of said two discrete location vibration sensors.

6. A method as set forth in claim 3 wherein said computing signal energy rate includes;
   sequentially sampling said at least one output signal of said at least one discrete location vibration sensor according to a pre-selected signal sampling frequency to produce sequential signal samples,
   using a time step moving variance with said sequential signal samples to compute signal variances of sequential sample blocks, each sample block comprising a set of a preselected number of sequential signal samples that span a sampling time,
   computing a sum of said signal variances for a summation period corresponding with a time period in which said vehicle passes over said at least one discrete location vibration sensor.

7. A method as set forth in claim 6 wherein said computing a sum of said signal variances further comprises computing a sum of very near field signal variances, said very near field signal variances being said signal variances that exceed a very near field threshold value.

8. A method as set forth in claim 7 wherein said computing a sum of said very near field signal variances for a summation period further comprises computing a sum of said very near field signal variances for said very near field summation period starting upon a vehicle's frontmost wheel-generated very near field vibration first being sensed by said at least one discrete location vibration sensor and ends upon said vehicle's rearmost wheel-generated very near field vibrations last being sensed by said at least one vibration sensor.

9. A method as set forth in claim 8 wherein said computing a sum of said very near field signal variances for said very near field summation period further comprises starting said very near field summation period upon a first said signal variance exceeding said very near field threshold value.

10. A method as set forth in claim 8 wherein said computing a sum of said very near field variances for said very near field summation period further comprises ending said very near field summation period when said very near field signal variances fall below said very near field threshold for a period of time exceeding an intra-truck null time.

11. A method as set forth in claim 8 wherein said attaching sensors further comprises mounting at least one proximity sensor disposed to sense presence of said vehicle at a summation period start location on said bridge, said summation period start location in operative relationship with said at least one discrete location vibration sensor; and further comprising:
   sensing a front of said vehicle arriving at said summation period start location using said at least one proximity sensor, and wherein said computing a sum of very near field variances for said very near field summation period further comprises starting said very near field summation period at a time based on said front wheel of said moving vehicle arriving at said summation period start location.

12. A method as set forth in claim 8 wherein said attaching sensors further comprises mounting at least one proximity sensor disposed to sense presence of said vehicle at a summation period end location on said bridge, said summation period end location in operative relationship with said at least one discrete location vibration sensor, and further comprising:
   sensing an end of said moving vehicle leaving said summation period start location using said at least one proximity sensor, and wherein said computing a sum of very near field variances for said very near field summation period further comprises ending said very near field summation period after a start at a time based on said moving vehicle leaving said summation period end location.

13. A method as set forth in claim 6 further comprising using a signal sampling frequency of 500 Hz, and said using a time step moving variance further comprises selecting a size of said sample blocks to be 25 samples.

14. A method as set forth in claim 3 wherein said computing weight of said moving vehicle further comprises computing wherein in which said coefficient of proportionality is equal to a product of a calibration constant for a reference pavement design and an adjustment factor that accounts for differences of pavement design with said reference pavement design.

15. A method as set forth in claim 3 wherein said attaching sensors further comprises mounting at least one of a pavement temperature sensor and a pavement moisture sensor, and further comprising sensing at least one of pavement temperature and pavement moisture, and wherein said computing weight of said moving vehicle further comprises computing in which said coefficient of proportionality is equal to a product of a calibration constant for a reference pavement condition and an adjustment factor that accounts for differences with said reference pavement condition based on sensor signals of said at least one of said pavement temperature sensor and pavement humidity sensor.

16. A method as set forth in claim 1 wherein said mounting at least one discrete location vibration sensor further comprises mounting of at least one accelerometer.

17. A method as set forth in claim 1 wherein said mounting at least one discrete location vibration sensor further comprises mounting of three directionally-sensitive accelerometers each disposed along mutually orthogonal axes.

18. A method as set forth in claim 1 wherein said attaching sensors further comprises mounting a vehicle speed sensor.

19. A method as set forth in claim 7 further comprising calculating said very near field threshold value to be equal to a product of a reference speed and a ratio of vehicle speed to said reference speed.

20. A method as set forth in claim 10 further comprising calculating said maximum intra truck null time to be a value equal to a pre-selected distance related to the quotient of a maximum intra truck axle separation distance divided by vehicle speed.

* * * * *